US009871895B2

(12) United States Patent
Murashkin et al.

(10) Patent No.: US 9,871,895 B2
(45) Date of Patent: Jan. 16, 2018

(54) APPARATUS AND METHODS FOR OPTIMIZING DIRTY MEMORY PAGES IN EMBEDDED DEVICES

(71) Applicant: Google Inc., Mountain View, CA (US)

(72) Inventors: Igor Murashkin, Sunnyvale, CA (US); Ian Andrew Rogers, Cupertino, CA (US)

(73) Assignee: Google LLC, Mountain View, CA (US)

( * ) Notice: Subject to any disclaimer, the term of this patent is extended or adjusted under 35 U.S.C. 154(b) by 308 days.

(21) Appl. No.: 14/696,205

(22) Filed: Apr. 24, 2015

(65) Prior Publication Data

US 2016/0314134 A1    Oct. 27, 2016

(51) Int. Cl.
*G06F 17/30* (2006.01)
*H04L 29/14* (2006.01)
*H04L 29/08* (2006.01)

(52) U.S. Cl.
CPC .......... *H04L 69/40* (2013.01); *H04L 67/1097* (2013.01)

(58) Field of Classification Search
CPC ..... H04L 69/40; H04L 67/1097; H04L 29/14; H04L 29/08
USPC .................. 707/649, 657, 660, 813, 999.206
See application file for complete search history.

(56) References Cited

U.S. PATENT DOCUMENTS

| 5,485,613 | A | * | 1/1996 | Engelstad | ........... G06F 12/0253 |
| 5,687,368 | A | * | 11/1997 | Nilsen | ................. G06F 12/0269 |
| 5,717,394 | A | * | 2/1998 | Schwartz | ............ H03M 7/4006 341/107 |
| 6,098,158 | A |   | 8/2000 | Lay et al. | |
| 6,609,088 | B1 | * | 8/2003 | Wuytack | ................. G06F 8/433 703/21 |
| 6,631,425 | B1 | * | 10/2003 | Helland | ................ G06F 9/4435 719/315 |
| 6,985,976 | B1 | * | 1/2006 | Zandonadi | ............ G06F 12/023 707/999.2 |
| 7,376,945 | B1 |   | 5/2008 | Kakumani et al. | |
| 7,458,073 | B1 |   | 11/2008 | Darling et al. | |
| 8,244,969 | B2 |   | 8/2012 | McWilliams et al. | |
| 2007/0128899 | A1 |   | 6/2007 | Mayer | |

(Continued)

OTHER PUBLICATIONS

Google Inc., "Managing Your App's Memory", Oct. 16, 2013.

(Continued)

*Primary Examiner* — Mohammed R Uddin
(74) *Attorney, Agent, or Firm* — McDonnell Boehnen Hulbert & Berghoff LLP

(57) ABSTRACT

Disclosed are apparatus and methods for providing images of memory objects. A computing device can receive a plurality of memory objects for one or more executable software components. The computing device can classify the plurality of memory objects in accord with a plurality of object classifications. A particular object classification can represent a probability that a memory object classified with the particular object classification is to be written to during execution of the one or more executable software components. The computing device can order the plurality of memory objects based on the plurality of object classifications. The computing device can provide an image for the one or more executable software components using the computing device, where the image includes the ordered plurality of memory objects.

20 Claims, 11 Drawing Sheets

(56) References Cited

U.S. PATENT DOCUMENTS

| | | | |
|---|---|---|---|
| 2007/0174555 A1* | 7/2007 | Burtscher | G06F 9/3851 711/137 |
| 2008/0177994 A1 | 7/2008 | Mayer | |
| 2008/0222380 A1* | 9/2008 | Sze | G06F 12/023 711/170 |
| 2008/0244533 A1* | 10/2008 | Berg | G06F 11/3447 717/128 |
| 2008/0301256 A1* | 12/2008 | McWilliams | G06F 12/0284 709/214 |
| 2009/0327372 A1* | 12/2009 | Ylonen | G06F 12/0253 |
| 2010/0287363 A1 | 11/2010 | Thorsen | |
| 2011/0145609 A1* | 6/2011 | Berard | G06F 1/3203 713/320 |
| 2011/0161615 A1* | 6/2011 | Odaira | G06F 12/0269 711/166 |
| 2011/0246742 A1* | 10/2011 | Kogen | G06F 12/023 711/170 |
| 2011/0264870 A1* | 10/2011 | Ylonen | G06F 12/0261 711/154 |
| 2011/0271070 A1* | 11/2011 | Worthington | G06F 12/1009 711/165 |
| 2012/0089803 A1* | 4/2012 | Dice | G06F 12/0223 711/171 |
| 2012/0089825 A1* | 4/2012 | Jung | G06F 9/4418 713/2 |
| 2013/0326166 A1* | 12/2013 | Desai | G06F 9/5016 711/158 |
| 2014/0136873 A1* | 5/2014 | Breternitz | G06F 1/3275 713/340 |
| 2014/0281458 A1* | 9/2014 | Ravimohan | G06F 9/4401 713/2 |
| 2014/0372715 A1* | 12/2014 | Bak | G06F 12/126 711/158 |
| 2015/0006843 A1* | 1/2015 | Moser | G06F 12/023 711/170 |
| 2015/0095576 A1* | 4/2015 | Subrahmanyam | G06F 12/0891 711/119 |

OTHER PUBLICATIONS

B. Plankers, "Better Linux Disk Caching & Performance with vm.dirty_ratio & vm.dirty_background_ratio", Dec. 22, 2013, available via the internet at lonesysadmin.net/2013/12/22/better-linux-disk-caching-performance-vm-dirty_ratio (last visited Apr. 25, 2015).

I. Rogers et al., "Boot Image Layout for Jikes RVM", Jul. 7, 2008, Implementation, Compilation, Optimization of Object-Oriented Languages, Programs and Systems (ICOOOLPS), available via the internet at apt.cs.manchester.ac.uk/ftp/pub/apt/papers/RogersZhaoWatson_ICOOOLPS2008_bootimage.pdf (last visited Apr. 25, 2015).

* cited by examiner

FIG. 3

Bins 300

| Bin 1 | Bin 2 | Bin 3 | Bin 4 | Bin 5 | Bin 6 | Bin 7 | Bin 8 | Bin 9 | Bin 10 |
|---|---|---|---|---|---|---|---|---|---|
| MO205 | MO209 | MO224 | MO230 | MO235 | MO245 | MO250 | MO264 | MO269 | MO274 |
| MO206 | MO210 | MO223 | MO226 | MO238 | MO247 | MO249 | MO263 | MO270 | MO276 |
| MO208 | MO215 | MO217 | MO225 | MO236 | MO243 | MO251 | MO258 | MO266 | MO273 |
| MO201 | MO214 | MO220 | MO229 | MO234 | MO246 | MO256 | MO257 | MO268 | MO278 |
| MO204 | MO213 | MO222 | MO228 | MO239 | MO244 | MO252 | MO260 | MO271 | MO279 |
| MO202 | MO216 | MO219 | MO232 | MO237 | MO242 | MO254 | MO262 | MO265 | MO280 |
| MO203 | MO211 | MO218 | MO227 | MO240 | MO248 | MO255 | MO261 | MO272 | MO277 |
| MO207 | MO212 | MO221 | MO231 | MO233 | MO241 | MO253 | MO259 | MO267 | MO275 |

Image 310

| Page 1 | Page 2 | Page 3 | Page 4 | Page 5 | Page 6 | Page 7 | Page 8 | Page 9 | Page 10 |
|---|---|---|---|---|---|---|---|---|---|
| MO205 | MO209 | MO224 | MO230 | MO235 | MO245 | MO250 | MO264 | MO269 | MO274 |
| MO206 | MO210 | MO223 | MO226 | MO238 | MO247 | MO249 | MO263 | MO270 | MO276 |
| MO208 | MO215 | MO217 | MO225 | MO236 | MO243 | MO251 | MO258 | MO266 | MO273 |
| MO201 | MO214 | MO220 | MO229 | MO234 | MO246 | MO256 | MO257 | MO268 | MO278 |
| MO204 | MO213 | MO222 | MO228 | MO239 | MO244 | MO252 | MO260 | MO271 | MO279 |
| MO202 | MO216 | MO219 | MO232 | MO237 | MO242 | MO254 | MO262 | MO265 | MO280 |
| MO203 | MO211 | MO218 | MO227 | MO240 | MO248 | MO255 | MO261 | MO272 | MO277 |
| MO207 | MO212 | MO221 | MO231 | MO233 | MO241 | MO253 | MO259 | MO267 | MO275 |

FIG. 4

Image 310

| Page 1 | Page 2 | Page 3 | Page 4 | Page 5 | Page 6 | Page 7 | Page 8 | Page 9 | Page 10 |
|---|---|---|---|---|---|---|---|---|---|
| 205 | 209 | 224 | 230 | 235 | 245 | 250 | 264 | 269 | 274 |
| 206 | 210 | 223 | 226 | 238 | 247 | 249 | 263 | 270 | 276 |
| 208 | 215 | 217 | 225 | 236 | 243 | 251 | 258 | 266 | 273 |
| 201 | 214 | 220 | 229 | 234 | 246 | 256 | 257 | 268 | 278 |
| 204 | 213 | 222 | 228 | 239 | 244 | 252 | 260 | 271 | 279 |
| 202 | 216 | 219 | 232 | 237 | 242 | 254 | 262 | 265 | 280 |
| 203 | 211 | 218 | 227 | 240 | 248 | 255 | 261 | 272 | 277 |
| 207 | 212 | 221 | 231 | 233 | 241 | 253 | 259 | 267 | 275 |

| Image 310 Page | Dirty % |
|---|---|
| 1 | 0% |
| 2 | 0% |
| 3 | 0% |
| 4 | 0% |
| 5 | 38% |
| 6 | 75% |
| 7 | 75% |
| 8 | 100% |
| 9 | 88% |
| 10 | 100% |
| Avg | 79% |

Image 400

| Page 1 | Page 2 | Page 3 | Page 4 | Page 5 | Page 6 | Page 7 | Page 8 | Page 9 | Page 10 |
|---|---|---|---|---|---|---|---|---|---|
| 230 | 250 | 276 | 217 | 229 | 214 | 227 | 204 | 218 | 259 |
| 264 | 249 | 243 | 278 | 228 | 208 | 213 | 211 | 261 | 221 |
| 263 | 270 | 210 | 279 | 232 | 244 | 231 | 252 | 254 | 255 |
| 235 | 247 | 226 | 251 | 257 | 201 | 216 | 265 | 203 | 253 |
| 209 | 224 | 225 | 215 | 260 | 242 | 277 | 202 | 237 | 233 |
| 269 | 274 | 258 | 266 | 246 | 256 | 268 | 239 | 240 | 241 |
| 245 | 236 | 273 | 280 | 206 | 222 | 262 | 275 | 272 | 212 |
| 238 | 223 | 234 | 205 | 220 | 248 | 271 | 219 | 267 | 207 |

| Image 400 Page | Dirty % |
|---|---|
| 1 | 75% |
| 2 | 50% |
| 3 | 38% |
| 4 | 62% |
| 5 | 38% |
| 6 | 38% |
| 7 | 50% |
| 8 | 38% |
| 9 | 50% |
| 10 | 38% |
| Avg | 48% |

Written MO List 410
MO233 MO235 MO238 MO241 MO242 MO245 MO246 MO247 MO248 MO249 MO250 MO251 MO252
MO254 MO256 MO257 MO258 MO259 MO260 MO261 MO262 MO263 MO264 MO265 MO266 MO267
MO268 MO269 MO271 MO272 MO273 MO274 MO275 MO276 MO277 MO278 MO279 MO280

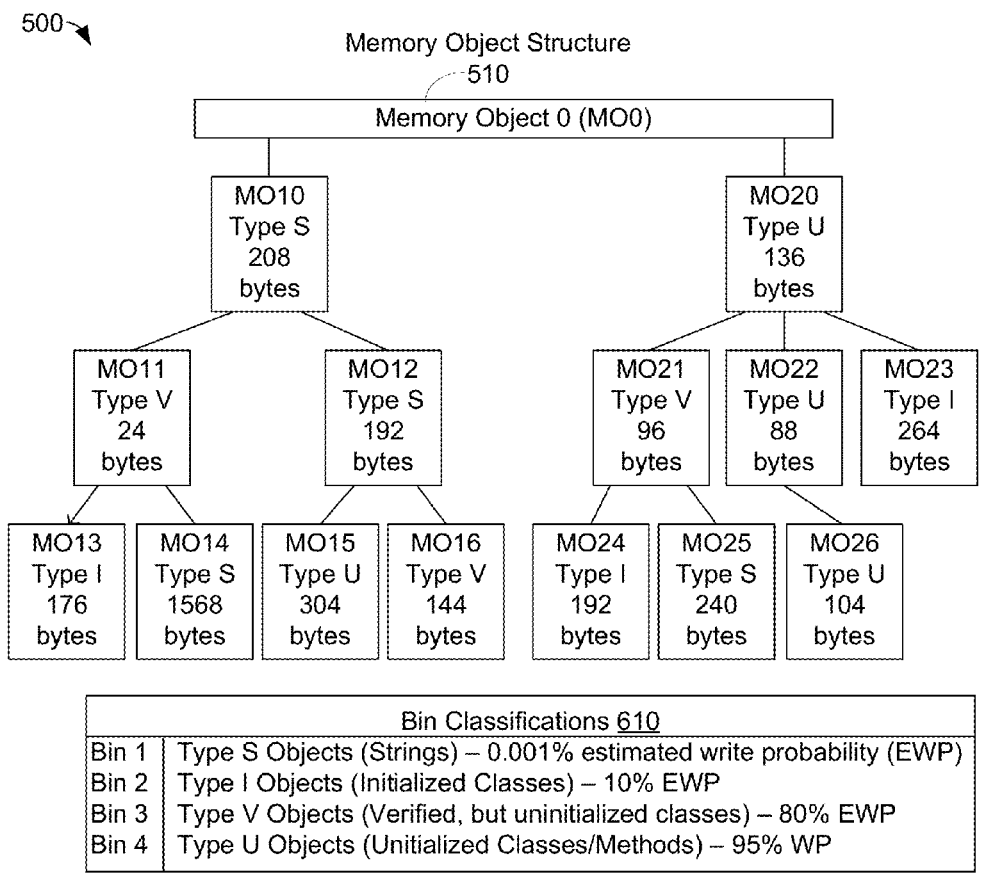
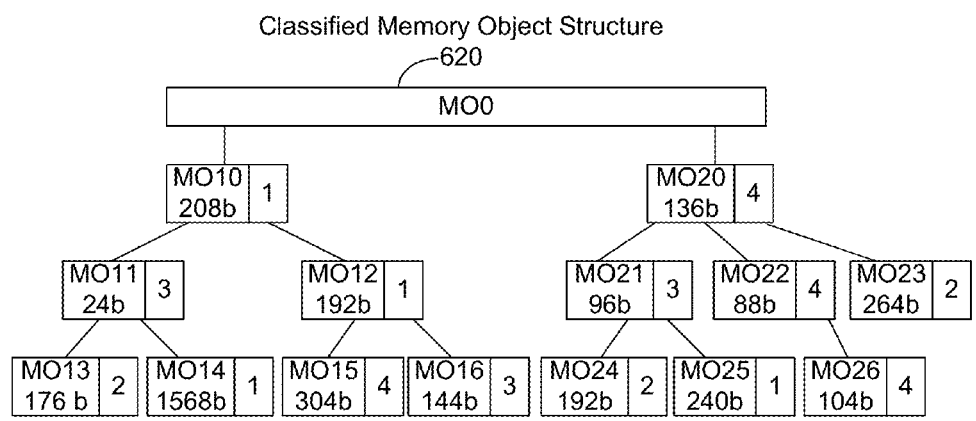
FIG. 6

500

Written MO List 810
MO11 MO15 MO16 MO21 MO22 MO23 MO26

Loaded Image 850

| MO10 (208b) | MO14 (512b) | MO14 (512b) | MO14 (440b) | MO12 (120b) | MO16 (56b) | MO25 (208b) | MO23 (152b) |
| MO11 (24b) | | | | MO15 (304b) | MO20 (136b) | MO22 (88b) | |
| MO13 (176b) | | | | MO16 (88b) | MO21 (96b) | MO26 (104b) | Not used (360b) |
| MO14 (104b) | | | | | MO24 (192b) | MO23 (112b) | |
| | | | MO12 (72b) | | MO25 (32b) | | |
| 5% | | | | 77% | 30% | 59% | 30% |

Loaded Image 850 is image 530 loaded into 8 pages. After writes corresponding to written MO list 810, loaded image 850 has 5 dirty pages with overall dirty percentage equal to 40%

Loaded Image 870

| MO10 (208b) | MO14 (512b) | MO14 (512b) | MO14 (240b) | MO25 (160b) | MO24 (16b) | MO21 (32b) | MO22 (48b) |
| | | | | | MO23 (264b) | MO15 (304b) | MO26 (104b) |
| MO14 (304b) | | | MO12 (192b) | MO13 (176b) | MO11 (24b) | | Not used (360b) |
| | | | | | MO16 (144b) | MO20 (136b) | |
| | | | MO25 (80b) | MO24 (176b) | MO21 (64b) | MO22 (40b) | |
| | | | | | 97% | 73% | 30% |

Loaded Image 870 is image 730 loaded into 8 pages. After writes corresponding to written MO list 810, loaded image 870 has 3 dirty pages with overall dirty percentage equal to 66.7%

FIG. 8

APPARATUS AND METHODS FOR OPTIMIZING DIRTY MEMORY PAGES IN EMBEDDED DEVICES

BACKGROUND

Unless otherwise indicated herein, the materials described in this section are not prior art to the claims in this application and are not admitted to be prior art by inclusion in this section.

Many computing devices are initialized using disk or memory images. A disk image includes one or more files that together hold the contents and structure of part or all of a data storage device, such as a hard drive, an optical disk, or a flash drive. A memory image includes one or more files that together hold the contents and structure of part or all of a computer memory, such as a random access memory (RAM). Typically, disc or memory images are created by creating a "snapshot" or page-by-page copy of RAM or a sector-by-sector copy of a disc or other drive. Thus, the disk or memory image can be an exact copy of the structure and contents of a storage device or memory independent of a file or memory system used to store files on the data storage device. Depending on the image format, a disk or memory image may span one or more computer files.

One example disk or memory image is a boot image which includes the software and related data to allow a device to be powered up; i.e., be booted. For example, a boot image for an application runtime is created by taking a snapshot of RAM storing the application and saving the snapshot to one or more files representing the boot image. The boot image can then later be loaded, perhaps using a single memory mapping command provided on several modern computing systems.

SUMMARY

In one aspect, a method is provided. A computing device receives a plurality of memory objects for one or more executable software components. The computing device classifies the plurality of memory objects in accord with a plurality of object classifications, where a particular object classification of the plurality of object classifications represents a probability of writing to a memory object classified with the particular object classification during execution of the one or more executable software components. The computing device orders the plurality of memory objects based on the plurality of object classifications in a non-transitory memory of the computing device. The computing device provides an image for the one or more executable software components. The image includes the ordered plurality of memory objects.

In another aspect, a computing device is provided. The computing device includes one or more processors and data storage. The data storage has instructions stored thereon that, upon execution of the instructions by the one or more processors, cause the one or more processors to perform functions. The functions include: receiving a plurality of memory objects for one or more executable software components; classifying the plurality of memory objects in accord with a plurality of object classifications, where a particular object classification of the plurality of object classifications represents a probability of writing to a memory object classified with the particular object classification during execution of the one or more executable software components; ordering the plurality of memory objects based on the plurality of object classifications in the data storage; and providing an image for the one or more executable software components, where the image includes the ordered plurality of memory objects.

In yet another aspect, an article of manufacture is provided. The article of manufacture includes non-transitory data storage having instructions stored thereon that, when executed by one or more processors, cause the one or more processors to perform functions. The functions include: receiving a plurality of memory objects for one or more executable software components; classifying the plurality of memory objects in accord with a plurality of object classifications, where a particular object classification of the plurality of object classifications represents a probability of writing to a memory object classified with the particular object classification during execution of the one or more executable software components; ordering the plurality of memory objects based on the plurality of object classifications; and providing an image for the one or more executable software components, where the image includes the ordered plurality of memory objects.

In even another aspect, a device is provided. The device includes: means for receiving a plurality of memory objects for one or more executable software components; means for classifying the plurality of memory objects in accord with a plurality of object classifications, where a particular object classification of the plurality of object classifications represents a probability of writing to a memory object classified with the particular object classification during execution of the one or more executable software components; means for ordering the plurality of memory objects based on the plurality of object classifications; and means for providing an image for the one or more executable software components, where the image includes the ordered plurality of memory objects.

BRIEF DESCRIPTION OF THE FIGURES

In the figures:

FIG. 3 shows part of the first memory object structure of the scenario of FIG. 2 stored in a number of bins and in a corresponding memory image, in accordance with an example embodiment FIG. 4 shows two memory images of scenario of FIG. 2 after several memory writes have occurred, in accordance with an example embodiment.

FIG. 6 shows the second memory object structure of FIG. 5 and corresponding bin classifications and a classified memory object structure, in accordance with an example embodiment.

FIG. 8 shows the example memory image of FIG. 5 and the example memory image of FIG. 7 after being loaded into memory as respective loaded images and after several memory writes have occurred, in accordance with an example embodiment.

DETAILED DESCRIPTION

Figure 1:
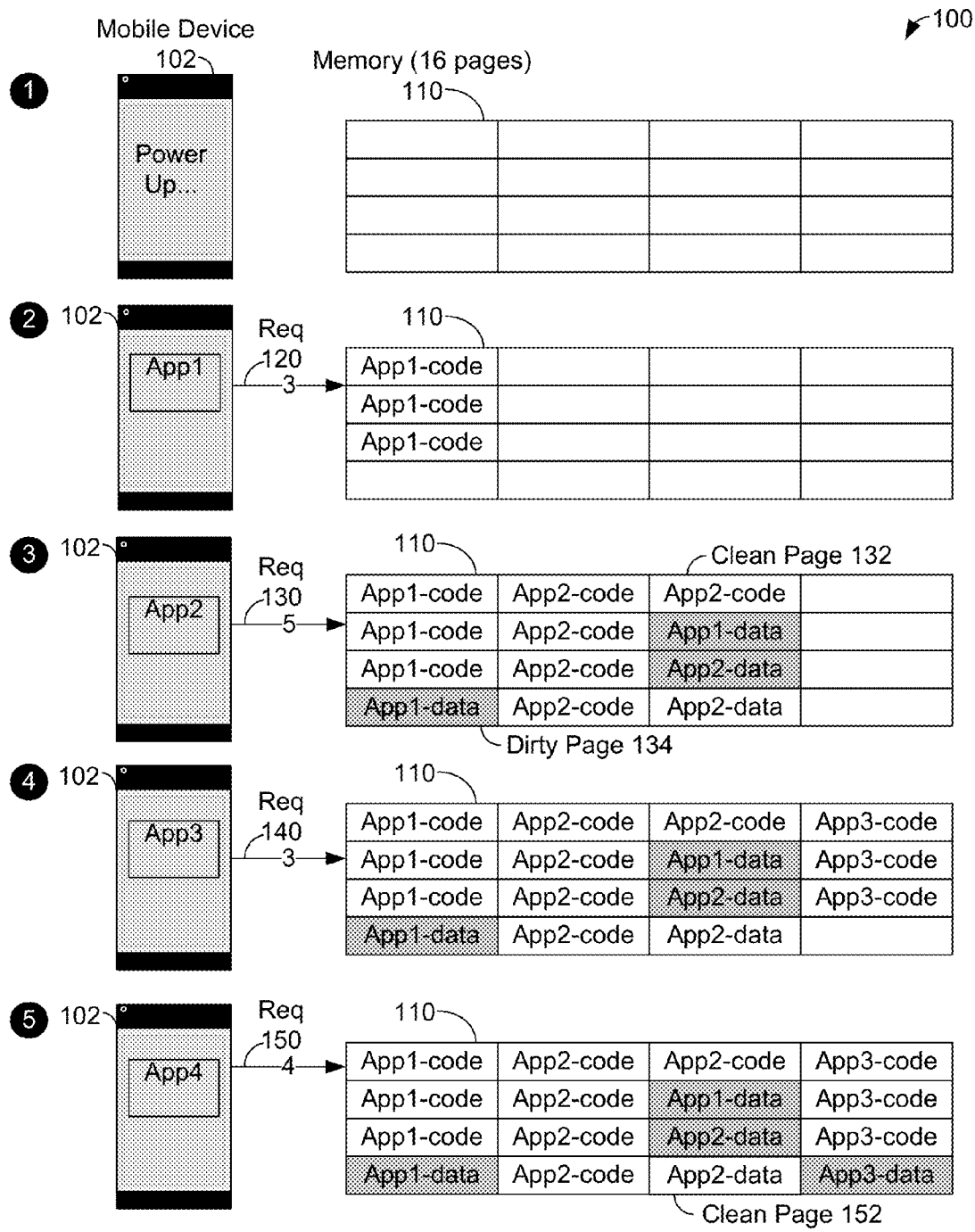
FIG. 1 shows a scenario where several applications are started and run on a mobile device, in accordance with an example embodiment.

Modern mobile operating systems can provide the appearance that all applications on a mobile device, such as a smart phone, that are not explicitly closed are always running. In reality, though, some active applications are not running, since active applications take up random access memory, which can be relatively scarce on the mobile device. For example, suppose a mobile device has between 1 and 4 gigabytes (GBs) of RAM available for loading software. A typical application can easily use 100 MB, and the mobile operating system can reserve ~300 MB for system use. In this example, a mobile device having only 1 GB of memory could only run 7 applications simultaneously.

RAM in the mobile device can be divided into one or more memory pages, each of which can be of a predetermined fixed size. Common examples of the predetermined fixed size of a memory page are 2 KB, 4 KB, and 8 KB, but other memory page sizes are possible as well. For example, if a mobile device has 2 GB of RAM that is divided into 4 KB memory pages, the mobile device then has 512K memory pages. One classification of memory pages can depend on a write status of the memory pages; that is, a memory pages can be classified as either being a "clean" page or a "dirty" page. A clean page is a memory page that has not been written to after being read into RAM, while a dirty page is a memory page that has been written to after being read into RAM.

When the memory limit of a mobile device is close to being reached; i.e., after several applications have been loaded, the mobile operating system can be forced to unload some or all of the applications in an attempt to get more free memory. Then, one approach to reduce the likelihood that applications are forcibly unloaded by the mobile operating system is to reduce the number of dirty pages associated with the application.

A memory image, such as a boot image for an application runtime, can be created by taking a snapshot of memory and saving it to disk. If the mobile operating system decides to reclaim any memory from an application, the mobile operating system can try to find clean memory pages first for reclamation, as clean memory pages do not have to be written back to a storage device (e.g., a flash drive, flash memory, a disk drive) after reclamation. In contrast, dirty pages to have to be written back to the storage device to capture the writes made to the dirty memory page. As clean pages do not have to be rewritten, clean pages take fewer resources to reclaim than dirty pages.

The above-mentioned memory snapshot can include one or more "memory objects" (MOs), which can include various pieces of initialized memory. For example, a memory object can be or correspond to one or more software objects, data, and/or computer instructions, and the software object(s) can be part or all of one or more software components, such as software modules, functions, and/or applications. Some or all of the memory objects can have different sizes and/or memory types; e.g., memory types can reflect how application software uses the memory object, such as a string type, code method type, field type, array type, etc. In some embodiments, the memory objects can be part or all of one or more executable software components are configured to run upon initialization of a computing device.

An analysis of memory types can indicate that some memory types are associated with memory objects that are likely or extremely likely to be written to by an application, while other memory types are associated with other memory objects that unlikely or extremely unlikely to be written to by the application. For example, the analysis can be performed by inspecting memory objects used by one or more application(s) for dirty/clean status after the applications have been executing just prior to generating a corresponding memory image.

To reduce the number of dirty pages associated with the application, a memory image can be generated so to maximize the "dirty percentage" or percentage of storage likely to be occupied by objects that have been written to, in each dirty page associated with the application. Dirty pages with high dirty percentages can store a relatively-high number of dirty objects and so minimize the number of pages used to store dirty objects. In contrast, if a dirty page has a relatively low dirty percentage, then the dirty page has only a small portion that is actually written to, indicating a relatively-high number of dirty objects stored in the dirty page and representing a missed opportunity to arrange memory objects to arrive at another clean page suitable for easy reclamation.

Based on the above-mentioned analysis of memory types, likely and unlikely dirty memory objects can be classified based on their respective memory types. Within the same memory type, objects can be further segregated into different dirty-likeliness categories by examining how their metadata differs: for example, class types can be either initialized or uninitialized, and such an initialized/uninitialized status can be used an axis of classification.

Then, when a memory image for the application, such as a boot image, is generated, memory objects can be moved around during image generation to place them next to other memory objects that have a similar dirty-likeliness. One technique to move the objects next to other memory objects that have a similar dirty-likeliness is to traverse all memory objects to be written and put each object having a particular classification in a bin associated with the particular classification. Then, one or more bins can be used to represent the memory objects, with one bin for each object classification. When writing the image, the technique can involve: selecting a bin B out of the one or more bins, extracting the objects from bin B, and writing the objects from bin B to a memory image, marking bin B as visited, and repeating this process until all of the one or more bins have been visited, and so all objects would be written to the memory image.

This technique can create a memory image in a fast and expedient fashion. The technique can maximize the page-dirtiness-ratio when the application is running itself. In some embodiments, the technique may not introduce any additional dynamically-sized memory while placing objects into bins. In particular embodiments, placing objects into bins can occur ahead of time for writing the memory image, e.g., when building the operating system or processing an over-the-air OS update. This means a portion of the technique for placing objects into bins has the same memory overhead as when the technique is not running, and so the technique does not degrade a user experience in any observable way.

Example Memory Usage Scenario

FIG. 1 shows scenario 100, where several applications are started and run on mobile device 102, in accordance with an example embodiment. At the onset of scenario 100, shown in the portion of FIG. 1 labeled with an encircled number "1" at the left side of FIG. 1, mobile device 102 is powered up. Memory 110 of mobile device 102 having 16 total pages is shown as empty, where an empty page of memory 110 is represented by a white rectangle.

Scenario 100 continues with a request to load an application "App1" as shown in the portion of FIG. 1 labeled with an encircled number "2" at the left side of FIG. 1. Loading App1 includes a related memory request (Req) 120 for three pages in memory 110. In scenario 100, three pages in memory 110 are allocated to code (software) of App1 as shown in FIG. 1.

Scenario 100 continues with execution of application App1 leading to one dirty page of memory 110 allocated to App1. Unless otherwise stated herein, clean pages are shown in the Figures as having a white background; e.g., clean page 132 and dirty pages are shown in the Figures as having a grey background; e.g., dirty page 134.

Scenario 100 proceeds with mobile device 102 receiving a request to load an application "App2" as shown in the portion of FIG. 1 labeled with an encircled number "3" at the left side of FIG. 1. Loading App2 includes related memory request 130 for five pages in memory 110. In scenario 100, five pages in memory 110 are allocated to code for App2 as shown in FIG. 1, as well as another dirty page for App1 and two dirty pages for App2, leading to twelve allocated pages out of sixteen total pages in memory 110, or, equivalently, four free pages remain in memory 110.

Scenario 100 continues with mobile device 102 allocating one page to App3, which is then dirtied, and then receiving a request to load an application "App4" as shown in the portion of FIG. 1 labeled with an encircled number "5" at the left side of FIG. 1.

Loading App4 includes related memory request 150 for four pages in memory 110. In scenario 100, no free memory exists in memory 110 to fulfill memory request 150, so mobile device 102 can free four pages from memory 110 to fulfill the request or, alternatively, deny the request. Mobile device 102 can fulfill memory request 150 by using a garbage collector and/or other memory reclamation software to find objects for reclamation and indirectly obtain the requested pages of memory 110 via reclamation. For example, in some embodiments, the garbage collector can reclaim clean memory, e.g., clean page 152, but not modified (dirty) memory, e.g., dirty page 134. In particular embodiments, the garbage collector can only reclaim pages allocated to data, not code—in these embodiments, the garbage collector for scenario 100 can only reclaim one clean non-code page to reclaim, which is clean page 152.

If the garbage collector and/or other memory reclamation software does not reclaim enough memory, (a mobile operating system of) mobile device 102 can stop execution of least one or more applications, perhaps on a least-recently-used basis, reclaim both clean and dirty pages of the stopped applications, and reuse the reclaimed memory. This is not desirable due to the inconvenience of having application(s) involuntarily stopped and due to the expenditure of significant mobile device resources to restart involuntarily stopped application(s) at a later time, to reclaim memory of stopped application(s), to write reclaimed dirty pages, and to reload the stopped application(s) as requested.

Example Memory Image Generation Scenarios

To reduce the number of dirty pages associated with the application, a memory image can be generated so to maximize the dirty percentage. More formally, let $DP(P)=DO(P)/S(P)*100\%$, where $DP(P)$ is the dirty percentage for a page P, $DO(P)$ is the storage taken up by dirty objects stored by page P, and $S(P)$ is the storage size of P. For example pages P1 and P2, let $S(P1)=S(P2)=4$ KB$=4096$ bytes, $DO(P1)=100$ bytes, and $DO(P2)=3500$ bytes. Then, $DP(P1)=100/4096*100\%=2.44\%$, which can be considered to be relatively low. Also, $DP(P2)=3500/4096*100\%=85.45\%$, which can be considered to be relatively high.

Likely and unlikely dirty memory objects can be classified based on their respective memory types. Then, when a memory image for the application, such as a boot image, is generated, memory objects can be moved around during image generation to place them next to other memory objects that have a similar dirty-likeliness.

Table 1 below shows example pseudo-code for algorithm A1 for generating an image M that is likely to have dirty pages having high dirty percentages. Other implementations and variations of algorithm A1 are possible as well. Aspects of algorithm A1 are utilized, discussed, and illustrated by below; e.g., in the context of scenarios 200 and 500.

TABLE 1

```
// ALGORITHM A1
Let N = number of object classifications 1, 2, ... N
Let B₁, B₂, ... Bₙ = a group of N bins, initially all empty, with each bin having a size attribute
that is initialized to 0 and a wmark (watermark) attribute that is initialized in LOOP1.1 below.
// Assume classification 1 is assigned to bin B₁, classification 2 is assigned to bin B₂, ...
// classification N is assigned to bin Bₙ.
// The bins are logical - a bin only tracks the size (e.g., in bytes) of objects that are
// assigned to it. The bin structures themselves never grow in memory use.
// Algorithm A1 has two main loops LOOP1 and LOOP2 with an intermediate loop LOOP1.1.
// LOOP1 assigns objects to the logical bins,
// LOOP1.1 initializes a watermark value (discussed below) for each bin. The watermark value
// for a bin is an offset (address) into image M for writing objects of the bin, where the
// watermark value is initialized to an offset (address) indicating where the first object of the bin
// is to be written.
// LOOP2 takes objects from bins and puts the objects into an image M.
// LOOP1 - put objects into bins
Remove the visit mark from each object
FOR each object O to be written to the image M that is marked not visited
    Mark O as visited
    // Put O in bin B_{C(O)} by marking O with classification value C(O) + updating bin size
    Let C(O) = classification of O based on the N classifications
```

TABLE 1-continued

```
    Let L(O) = a predetermined location in memory associated with O that can be written.
    Store the value of C(O) at location L(O). // associate O with classification / bin
    B_{C(O)}.size = B_{C(O)}.size + sizeof(O). // add size of O to bin's size
    // End of putting O in bin B_{C(O)}
End FOR // for each object O in LOOP1
// LOOP1.1. - Initialize the watermark to the cumulative size of the previous bins.
B_1.wmark = 0; // Bin 1's watermark is 0, since there are no previous bins to bin 1.
FOR i = 2 to N
    Let j = i - 1; // j refers to previous bin
    B_i.wmark = B_j.wmark + B_j.size // current bin watermark = previous watermark + previous size
END FOR // LOOP1.1
// After running LOOP 1.1, the section of image M that holds objects of bin X can be defined
// in terms of starting and ending addresses for the bins; e.g.,
// starting address in M for storing objects for bin X: B_x.wmark
// ending address in M for storing objects for bin X: B_x.wmark + B_x.size - 1.
// LOOP2 - take objects from bins and put them into image M
Remove the visit mark from all objects
FOR each object O to be written to the image M that is not marked as visited
    Mark O as visited
    Obtain C(O) = the classification from O from L(O) // then, O is stored in bin B_{C(O)}.
    Write O to M starting at address B_{C(O)}.wmark;
    B_{C(O)}.wmark = B_{C(O)}.wmark + sizeof(O); // update watermark to account for writing O to M.
End FOR // for each object O of LOOP2.
```

The pseudocode of Algorithm A1 shown in Table 1 above includes three loops: LOOP1, LOOP1.1, and LOOP2. LOOP1 can assign each object to a bin based on a classification of the object. The classification of the object can relate to a write or dirty probability for the object to be written during execution of software that utilizes the object, or a corresponding probability for writing to/dirtying a page storing the object during execution of software that utilizes the object. In other embodiments, the classification of the object can relate to a likelihood that the object will not be written/stay clean execution of software that utilizes the object, or a corresponding probability for that the page storing the object will not be written/stay clean during execution of software that utilizes the object. For example, a write probability for an object (or page) is p where p is in the range [0, 1], then the corresponding probability for that the page storing the object (or page) will not be written/stay clean can be determined as 1-p, as the object (or page) will either be written to or not be written to during execution of software that utilizes the object.

LOOP2 can retrieve the objects from bins and write the objects to the image. Upon retrieval of an object, LOOP2 then writes the object to the image at an address within the image based on the bin associated with the object. In some examples, LOOP2 writes the objects in an order specified by a bin ordering that orders the bins. That is, if the bin ordering is based on classifications indicating increasing (or decreasing) write probabilities of objects or pages, then the objects can be written to the image in an order indicating increasing (or decreasing) write probabilities of objects or pages.

In the pseudocode of Table 1, a bin of algorithm A1 is shown as having two attributes: a size attribute and a "watermark" attribute. Table 1 indicates that the N bins are presumed to be ordered based on a classification of the objects to be written to the image; e.g., bin 1 is associated with object classification 1, bin 2 is associated with object classification 2, and so on until reaching bin N, which is associated with object classification N. The watermark attribute of a bin B can be set to a value equal to a sum of the sizes of the bins that precede bin B—for bin $B_1$, the watermark attribute can be set to 0; for bin $B_2$, the watermark attribute can be set to bin $B_1$.size; for bin $B_3$, the watermark attribute can be set to $B_1$.size+$B_2$.size; and so on, until reaching $B_N$ whose watermark attribute can be set to $\Sigma_{i=1}^{N-1} B_i$.size.

In these embodiments, and as shown above in Table 1, LOOP1 of Algorithm A1 visits each object, and inserts a visited object O into a bin BB associated with the classification of O, C(O) by: adding the size of the object to BB.size (the size attribute of bin BB) and writing L(O), which is a predetermined location in memory associated with object O, with the value of C(O). After LOOP1 as shown in Table 1 is completed, the size attributes for the bins are correct, but the watermark attributes are not yet correct. LOOP1.1 of Algorithm A1 then sets the watermark attributes of the bins as indicated in the immediately-preceding paragraph. In other embodiments of algorithm A1, the functionality of LOOP1.1 can be incorporated into LOOP1; e.g., if an object $O_z$ is to be associated with bin $B_z$, the watermark attributes can be updated by adding the size of $O_z$ to each watermark attribute of the bins (if any) succeeding bin $B_z$. LOOP2 of algorithm A1 then visits each object again. The value of C(O) for a visited object O is determined from L(O) and a bin $B_{C(O)}$ is determined for the object. The object O is written to an image M at an address $B_{C(O)}$.size+$B_{C(O)}$.wmark (the watermark attribute of bin $B_{C(O)}$), and $B_{C(O)}$.size is updated by adding the size of O, which acts to remove O from bin $B_{C(O)}$.

The end of LOOP2 can end algorithm A1. In some embodiments, image M can be written to permanent storage (e.g., a disk or flash drive) at a later time; e.g., other functionality and/or a delay can occur between running LOOP1.1 and LOOP2. That is, LOOP1 and LOOP1.1 can be executed prior to building an image; e.g., an operating system image and/or an image for an over-the-air update.

Algorithm A1 can maximize a likelihood of high dirty percentages in dirty pages by writing objects stored in bins associated with classifications that in turn are associated with likelihoods of high dirty percentages. Further, some implementations of algorithm A1 do not introduce use of additional dynamically-sized memory during execution, and thereby reduce the likelihood of adverse user experiences due to lack of dynamically-sized memory.

In some embodiments, L(O), which is a predetermined location in memory associated with O that can be written during LOOP1 of algorithm A1, can be a lock word or other memory location that is allocated as part of object O's storage. In other embodiments, L(O) can be in a data structure stored separately from O, such as a hash table, list, or array.

In still other embodiments, the bins of algorithm A1 can be replaced by a priority queue or similar data structure, where the priority for the priority queue is based on the classifications of the objects/likelihoods of page dirtiness. As such, adding the objects to the priority queue can have the effect of sorting the objects by likelihood of page dirtiness, and so only one visitation of each object is required. That is, LOOP2 can be replaced with a loop that takes the highest priority object from the object queue and writes the object taken from the priority queue to the image; e.g., LOOP2 of algorithm A1 can be replaced by a revised loop; e.g., LOOP2A.

Example pseudocode for LOOP2A shown in Table 1.1 immediately below, where the priority queue is indicated by "priority_queue", where "priority_queue.isempty( )" is an operation that returns TRUE when the priority queue is empty and FALSE otherwise, and where "priority_queue.dequeue( )" is an operation removes the highest priority item from the priority queue and returns the removed item.

TABLE 1.1

```
// LOOP2A
// WHILE the priority queue is not empty
WHILE (priority_queue.isempty( ) == FALSE)
    // Let O = the highest priority item retrieved from the queue
    O = priority_queue.dequeue( );
    // Write M in priority (likelihood of page dirtiness) order
    Write O to image M;
END // of WHILE and LOOP2A
```

Figure 2:
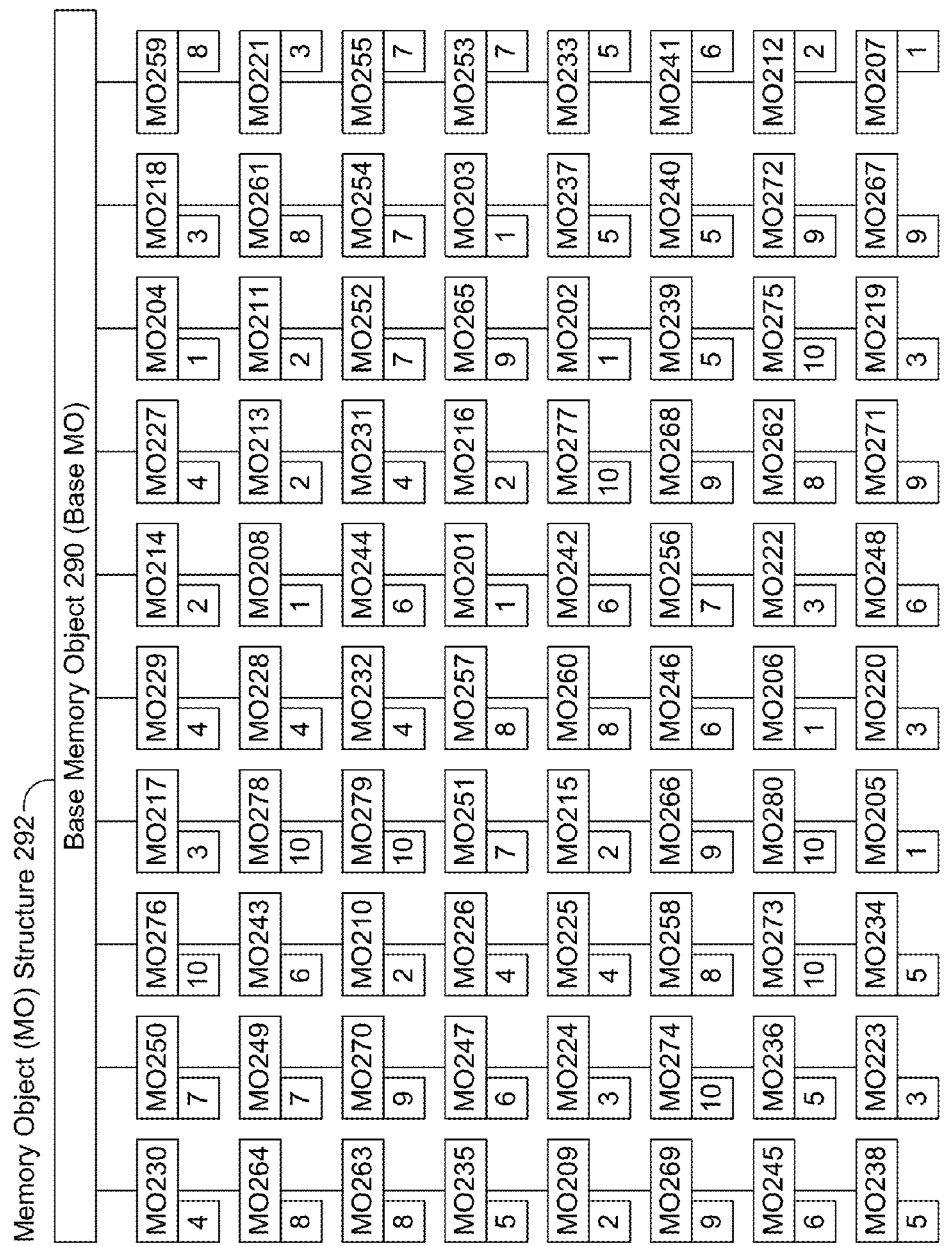
FIG. 2 shows a first memory object structure for a scenario where memory images related to the first memory object structure are generated, in accordance with an example embodiment.

FIG. 2 shows memory object structure 292 for scenario 200 where memory images related to memory object structure 292 are generated, in accordance with an example embodiment. Scenario 200 can be carried out by a computing device, such as computing device 1000 described below. In scenario 200, memory object structure 292 refers to eighty memory objects MO201, MO202 . . . MO280 that are to be written to an image. The eighty memory objects are each of equal size S, where S is one/eighth of a page size of the image. That is, the eighty memory objects can be written into an image having ten memory pages. FIG. 2 shows memory object structure 292 generally having a structure reflecting an array of bi-directional (undirected) references or edges, with each bi-directional reference/edge in the array referring to a chain of memory objects connected by bi-directional references/edges. In other scenarios, memory objects in memory object structure 292 can have additional and/or different edges between objects so that part or all of memory object structure 292 can be modeled using a graph, directed graph, cycle, grid, one or more arrays, one or more lists, one or more queues, tree, network, or some other data structure.

As shown in FIG. 2, Each of the eighty memory objects MO201-MO280 has one of ten classifications: 1, 2, 3, 4, 5, 6, 7, 8, 9, and 10, where the classification is shown adjacent to and underneath the memory object number—e.g., for MO259 at upper right of FIG. 2, the classification value is shown by an "8" adjacent to and below the "MO259" label.

Table 2 below indicates that each classification has a different estimated write probability (EWP) in scenario 200, and that each classification is associated with a range of memory object numbers of scenario 200.

TABLE 2

| Classification | Estimated write probability (likelihood of memory object dirtiness) for scenario 200 | Memory Object # Range |
|---|---|---|
| 1 | 1/10000 = 0.01% | MO201-MO208 |
| 2 | 2/10000 = 0.02% | MO209-MO216 |
| 3 | 1/1000 = 0.1% | MO217-MO224 |
| 4 | 10/100 = 10% | MO225-MO232 |
| 5 | 35/100 = 35% | MO233-MO240 |
| 6 | 50/100 = 50% | MO241-MO248 |
| 7 | 80/100 = 80% | MO249-MO256 |
| 8 | 85/100 = 85% | MO257-MO264 |
| 9 | 90/100 = 90% | MO265-MO272 |
| 10 | 95/100 = 95% | MO273-MO280 |

In scenario 200, the eighty memory objects MO201-MO280 are sorted into ten bins and written from the bins into image 310 using algorithm A1. Another image of the eighty memory objects, image 400, is generated based on the positions of the memory objects within memory object structure 292. An example set of memory object writes are performed for scenario 200 and the number of dirty pages for image 310 is compared to the number of dirty pages for image 400 indicating that image 310 has fewer dirty pages than image 400.

As shown in FIG. 2, memory object structure 292 has a base memory object, memory object 290, which has ten references to memory objects. The ten references refer to, from left to right in FIG. 2, memory object 230 of classification 4 of Table 2 above, memory object 250 of classification 7, memory object 276 of classification 10, memory object 217 of classification 3, memory object 229 of classification 4, memory object 214 of classification 2, memory object 227 of classification 4, memory object 204 of classification 1, memory object 218 of classification 3, and memory object 259 of classification 8.

In scenario 200, each memory object directly referenced by base memory object 290 references one memory object, which in turn references one memory object, and so on, until a chain of eight memory objects is made. For example, as shown at left of FIG. 2, base memory object 290 references memory object 230, which references memory object 264, which references memory object 263, which references memory object 235, which references memory object 209, which references memory object 269, which references memory object 245, which references memory object 238 that is at the end of a leftmost chain shown in FIG. 2.

As base memory object 290 directly references ten memory objects, a depth-first traversal of references directly referenced by base memory object 290 can lead to ten chains of eight memory objects are made from base memory object 290, for a total of eighty memory objects shown in FIG. 2 as MO201, MO202, . . . . MO280. In scenario 200, each memory object is associated with a classification—as indicated above in Table 2 and as shown in FIG. 2, memory objects 201 to 208 inclusive have classification 1, memory objects 209 to 216 inclusive have classification 2, and so on until reaching memory objects 273 to 280 that have classification 10. In scenario 200, a higher number classification indicates a higher write probability or likelihood of memory object (or corresponding page) dirtiness. As such, in scenario 200, as the memory object number between 201 and 280 increases, the estimated write probability increases as indicated in Table 2 above.

FIG. 3 shows part of the memory object structure 292 of scenario 200 stored in bins 300 and corresponding memory image 310, in accordance with an example embodiment.

Scenario 200 continues with memory objects MO201-MO280 pointed to by memory object 290 stored in bins 300 after execution of LOOP1 of algorithm A1, where bin 1 of bins 300 is associated with classification 1, bin 2 is associated with classification 2, ... and bin 10 is associated with classification 10. In scenario 200, memory objects are placed in bins by traversing the references from memory object 290 from left to right, where each reference is followed down a chain until reaching the end of a chain. For ease of illustration, FIG. 3 shows the memory objects stored in bins 1, 2 ... 10 as discussed above, LOOP1 does not store memory objects in bins—rather, memory objects are marked with a classification value corresponding to a bin. In other embodiments, LOOP1 can store objects in bins as indicated in FIG. 3 rather than marking the objects with classification values. In scenario 200, page 1 of image 310 stores the memory objects of bin 1, page 2 of image 310 stores the memory objects of bin 2, and so on, for ease of illustration—in general, page numbers and bin numbers can (and generally will) differ, as long as one or more pages of an image used to store memory objects in a lower numbered bin (e.g., bin N−1) precede one or more pages of the image used to store memory objects in a higher numbered bin (e.g., bin N).

After the memory objects 210-280 are visited by LOOP1 of algorithm A1 for placement into bins 300 for scenario 200, LOOP2 of algorithm A1 can be utilized to write memory objects from bins 300 to pages 1 to 10 of image 310. As shown in FIG. 3, page 1 of image 310 includes the eight memory objects of bin 1 of bins 300, page 2 of image 310 includes the eight memory objects of bin 2 of bins 300 ... and page 10 of image 310 includes the eight memory objects of bin 10 of bins 300.

FIG. 4 shows two memory images 310, 400 of scenario 200 after several memory writes have occurred, in accordance with an example embodiment. As discussed above, image 310 is generated using algorithm A1 discussed above in the context of at least Table 1. Another algorithm A2 for generating an image is shown in Table 3 below:

TABLE 3

```
// Algorithm A2
// write objects to an image M2
FOR each object O to be written to image M2
    IF (O has not been visited) then
        Mark O as visited
        Write O to image M2
    END IF // (O has been visited)
END FOR // each object O
```

Algorithm A2 involves retrieving an object from a memory structure or memory object 290; e.g., memory structure 292, base memory object 290, and writing the retrieved object to the image. In scenario 200, image 400 is generated by finding a leftmost unvisited reference of base memory structure 290 as shown in FIG. 2, visiting memory objects in a chain under the leftmost unvisited reference, and moving to the next leftmost unvisited reference base memory structure 290 until each of memory objects 201-280 have been visited and written to image 400. As shown in FIGS. 2 and 4, the eight memory objects in Page 1 of image 400—memory objects 230, 264, 263, 235, 209, 269, 245, and 238—are the memory objects in the leftmost chain referred to by base memory object 290. Similarly, the eight memory objects in Page 2 of image 400—memory objects 250, 249, 270, 247, 224, 274, 236, and 223—are the memory objects in the second-to-leftmost chain referred to by base memory object 290. As shown in FIGS. 2 and 4, Pages 3-10 of image 400 respectively contain the memory objects of the respective second-to-leftmost chain to rightmost (tenth-from-left) chains referred to by base memory object 290.

Scenario 200 continues with example writes to thirty-eight memory objects in image 310 and in image 400 being performed as shown in written MO list 410; e.g., the writes to the thirty-eight memory objects are performed during one or more executions of software that utilizes memory objects MO201-MO280. Each memory object shown in written MO list 410 is shown in each of images 310 and 400 of FIG. 4 with a grey background to represent a dirty/written-to memory object. In scenario 200, the example writes in written MO list 410 are based on the estimated write probabilities shown in Table 2 above.

As can be seen in FIG. 4, image 310, which is generated using algorithm A1 and so has memory objects arranged within the image based on the classifications of Table 2, has: (a) four pages (Pages 1-4) each with a dirty percentage of 0% indicating there are no dirty objects in each of these four pages, (b) two pages (Pages 8 and 10) each with a dirty percentage of 100% indicating all objects on each of the two pages are dirty), and (c) four other pages (Pages 5, 6, 7, and 9) having dirty percentages ranging from 38%-88%, indicating a range between 3 and 7 dirty objects in each of these pages. Then, an overall dirty percentage for an image can be determined by taking a ratio of the number of dirty objects in the image to the number of total objects stored in all dirty pages for image and multiplying that ratio by 100%. In scenario 200, image 310 has 38 dirty memory objects on six dirty pages, which can store 48 memory objects of scenario 200, and so has an overall dirty percentage of 38/48*100%=79%.

In contrast, image 400, which is generated using algorithm A2 and so has memory objects arranged within the image based on the order memory objects are initially visited, has: (a) no pages with a dirty percentage of 0%, (b) no pages with a dirty percentage of 100% indicating all objects on each of the two pages are dirty), and (c) ten pages with a dirty percentage ranging from 38%-75%, indicating a range between 3 and 6 dirty objects in each of these pages. Then, an overall dirty percentage for image 400 can be determined—in scenario 200, image 400 has 38 dirty memory objects on ten dirty pages, which can store 80 memory objects of scenario 200, and so has an overall dirty percentage of 38/80*100%=48%.

In summary, for the example writes shown in written MO list 410, image 310 generated using algorithm A1 leads to four fewer dirty pages than image 400, which is generated using algorithm A2. Further, the overall dirty percentage of 79% for image 310 is significantly higher than the 48% overall dirty percentage for image 410. These dirty page count and overall dirty percentage values indicate that algorithm A1 can generate images that have fewer dirty pages and whose dirty pages have higher overall dirty percentages than a naïve algorithm, such as algorithm A2.

Figure 5:
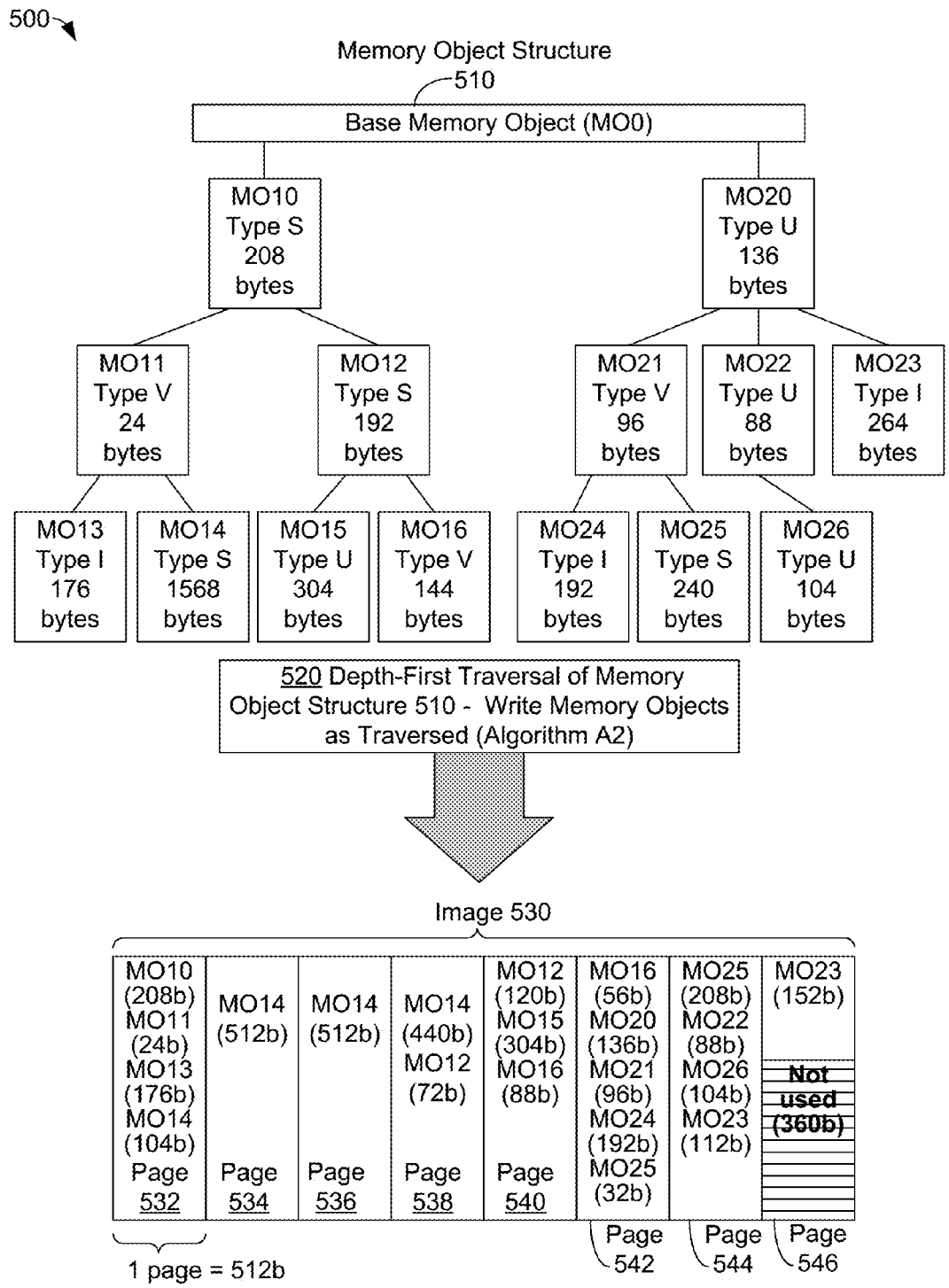
FIG. 5 shows a second memory object structure and corresponding image for another scenario where memory images related to the second memory object structure are generated, in accordance with an example embodiment.

FIG. 5 shows memory object structure 510 and corresponding image 530 for scenario 500 where memory images related to memory object structure 510 are generated, in accordance with an example embodiment. Scenario 500 can be carried out by a computing device, such as computing device 1000 described below. Scenario 500 includes images that use 512-byte sized pages; in other scenarios, pages in images can have different sizes (e.g., 256 bytes, 1024 bytes, 2048 bytes, 4096 bytes).

An example classification of memory objects utilized in scenario 500 based on likely dirtiness/cleanness based on object type is shown below in Table 4. The example classification is not necessarily limited to these types.

TABLE 4

Example Classification for Scenario 500

1. Strings - extremely unlikely to be dirtied since they are immutable in most runtimes. Estimated write probability (EWP) for scenario 500 = 0.001%.
1a. Fully initialized code methods without native code - extremely unlikely to be dirtied, since they have no other entry points from other parts of the code.
2. Initialized classes with no non-final statics - Mildly likely to dirty, since all the static fields are final (read-only), reducing the likelihood of writing to these classes. Estimated write probability for scenario 500 = 10%
2a. Other initialized classes - Fairly likely to dirty, as an initialized class can have write-able statics, leading to higher likelihood that a static field will be written to.
3. Classes that are verified, but not initialized - Extremely likely to dirty. Such classes have to be initialized upon first execution, and class initialization will dirty these pages. Estimated write probability for scenario 500 = 80%
3a. Native methods - Extremely likely to dirty. The managed entry points of these methods are resolved the first time the method is called, which will dirty the page.
4. Methods, whose classes are uninitialized - Extremely likely to dirty. Each initializing class can update their methods to mark the class as initialized, and so dirtying pages storing these methods. Estimated write probability for scenario 500 = 95%
5. All other types of objects - unknown likeliness of being dirtied.

In Table 4 above, classifications 1-4 are arranged in increasing likelihood of dirtiness. Classification 5, which is a catch-all classification, can be assigned, at least initially, with a moderate likelihood of dirtiness. A simplified version of the classifications shown in Table 4 is used in scenario 500, with objects of Type "S" (for "Strings") having classification 1, objects of Type "I" (for "Initialized" classes) having classification 2, objects of Type "V" (for classes that are "Verified", but not initialized) having classification 3, and objects of Type "U" (for methods whose classes are "Uninitialized") having classification 4. Additionally, Table 4 shows values of estimated write probabilities for classifications 1, 2, 3, and 4.

In scenario 500, memory object structure 510 includes a base memory object MO0 that directly or indirectly references fourteen memory objects: MO10, MO11, MO12, MO13, MO14, MO15, MO16, MO20, MO21, MO22, MO23, MO24, MO25, and MO26. The fourteen memory objects MO10-MO16 and MO20-MO26 are written to images using algorithms A1 and A2, where breadth-first traversal is used to visit the memory images for both algorithms A1 and A2. In other scenarios, other techniques than depth first traversal can be used to visit the fourteen memory objects; e.g., breadth first traversal, in-order traversal.

The fourteen memory objects MO10-MO16 and MO20-MO26 of scenario 500 range in size from 24 bytes (which can be abbreviated as 24b as depicted in FIGS. 5-8) for MO11 to 1568 bytes for MO14, and have a total size of 3736 bytes. In scenario 500, the images written by algorithms A1 and A2 each use 512 byte pages and do not have any per-object or other overhead, so each image takes up 3,736 bytes, which can fit into 8 pages. In the images written by algorithms A1 and A2 for scenario 500, if an object does not fit into one page, the object is broken up into portions that will fit into two or more pages. For example, in image 530, page 532 has 104 bytes available after memory objects MO10, MO11, and MO13 are written, as these three memory objects have a cumulative size of 408 bytes. However, MO14, which is the following memory object to be written to image 530, has a size of 1568 bytes. Then, the first 104 bytes of memory object MO14 are written to page 532 of image 530, the following 512 bytes of memory object MO14 are written to subsequent page 534, the following 512 bytes of memory object MO14 are written to subsequent page 536, and the remaining 440 bytes of memory object MO14 are written to subsequent page 538 of image 530.

FIG. 5 shows memory object structure 510 having a base memory object MO0 with direct references to memory objects MO10 and MO20. Memory object MO10 directly refers to memory objects MO11 and MO12, where memory object MO11 refers to memory objects MO13 and MO14, and where memory object MO12 refers to memory objects MO15 and MO16. Memory object MO10 directly refers to memory objects MO21, MO22, and MO22, where memory object MO21 refers to memory objects MO24 and MO25, and where memory object MO22 refers to memory object MO26. In scenario 500, each memory object in memory object structure 510 has one of four types and a corresponding classification: type "S" (for "Strings") having classification 1, type "I" (for "Initialized" classes) having classification 2, type "V" (for classes that are "Verified", but not initialized) having classification 3, or type "U" (for Methods, whose classes are "Uninitialized") having classification 4. FIG. 5 shows memory object structure 510 generally having a tree structure with bi-directional (undirected) edges between memory objects. In other scenarios, memory objects in memory object structure 510 can have additional and/or different edges between objects so that part or all of memory object structure 510 can be modeled using a graph, directed graph, cycle, grid, one or more arrays, one or more lists, one or more queues, tree, network, or some other data structure.

FIG. 5 shows that each of respective memory objects MO10, MO12, MO14, and MO25 are of type S/classification 1 and has a respective size of 208 bytes, 192 bytes, 1568 bytes, and 240 bytes; each of respective memory objects MO13, MO23, and MO24 are of type I/classification 2 and has a respective size of 176 bytes, 264 bytes, and 192 bytes; each of respective memory objects MO11, MO16, and MO21 are of type V/classification 3 and has a respective size of 24 bytes, 144 bytes, and 96 bytes; and each of respective memory objects MO15, MO20, MO22, and MO26 are of type U/classification 4 and has a respective size of 304 bytes, 136 bytes, 88 bytes and 104 bytes.

At block 520, algorithm A2 is executed to traverse memory object structure 510 to obtain image 530 of memory objects MO10-MO16 and MO20-MO26. Algorithm A2 can visit memory objects of memory object 510 using depth-first traversal and can write the objects to image 530 as traversed. FIG. 5 shows that image 530 occupies portions of eight pages, with page 532 storing memory objects MO10, MO11, MO13, and part of MO14, page 534 storing a portion of memory object MO14, page 536 storing a portion of memory object MO14, page 538 storing portions of memory objects MO14 and MO12, page 540 storing portions of memory objects MO12 and MO16 as well as all of memory object MO15, page 542 storing portions of memory objects MO16 and MO25, as well as all of memory objects MO20, MO21, and MO24, page 544 storing portions of memory objects MO25 and MO23 and all of memory objects MO22 and MO26, and page 546 storing a portion of memory object MO23.

FIG. 6 shows memory object structure 510 and corresponding bin classifications 610 and classified memory object structure 620, in accordance with an example embodiment. Scenario 500 continues with algorithm A1 generating an image of the fourteen memory objects MO10-MO16 and MO20-MO26 in memory structure 510. LOOP1 of algorithm A1 is executed and used to put memory objects MO10-MO16 and MO20-MO26 in memory structure 510 into bins. As discussed above, LOOP1 can put a memory object into a bin is by marking the memory object with the bin number and keep tracking of the size of each bin. In scenario 500, algorithm A1 utilizes the classifications mentioned above and shown in FIG. 6 as bin classifications 610. Bin classifications 610 also show the above-mentioned estimated write probabilities for each memory object type and corresponding bin number/classification; e.g., an object of Type S has a classification and bin number equal to 1 and an estimated write probability of 0.001%.

Executing LOOP1 generates classified memory object structure 620, with memory objects MO10-MO16 and MO20-MO26 having been marked with their corresponding classifications/bin numbers. For example, memory object MO10 is of type S, which has a corresponding classification/bin number of 1 as indicated by a classification for type S in bin classifications 610. In FIG. 6, the classification of a memory object in memory object structure 620 is shown adjacent and to the right of the memory object; e.g., memory object MO10 is shown with classification "1" as discussed above. As another example, memory object MO11 is of Type V, which has a bin number/classification of 3 as indicated in bin classifications 610 and as indicated to the right of MO11 in classified memory object structure 620.

Figure 7:
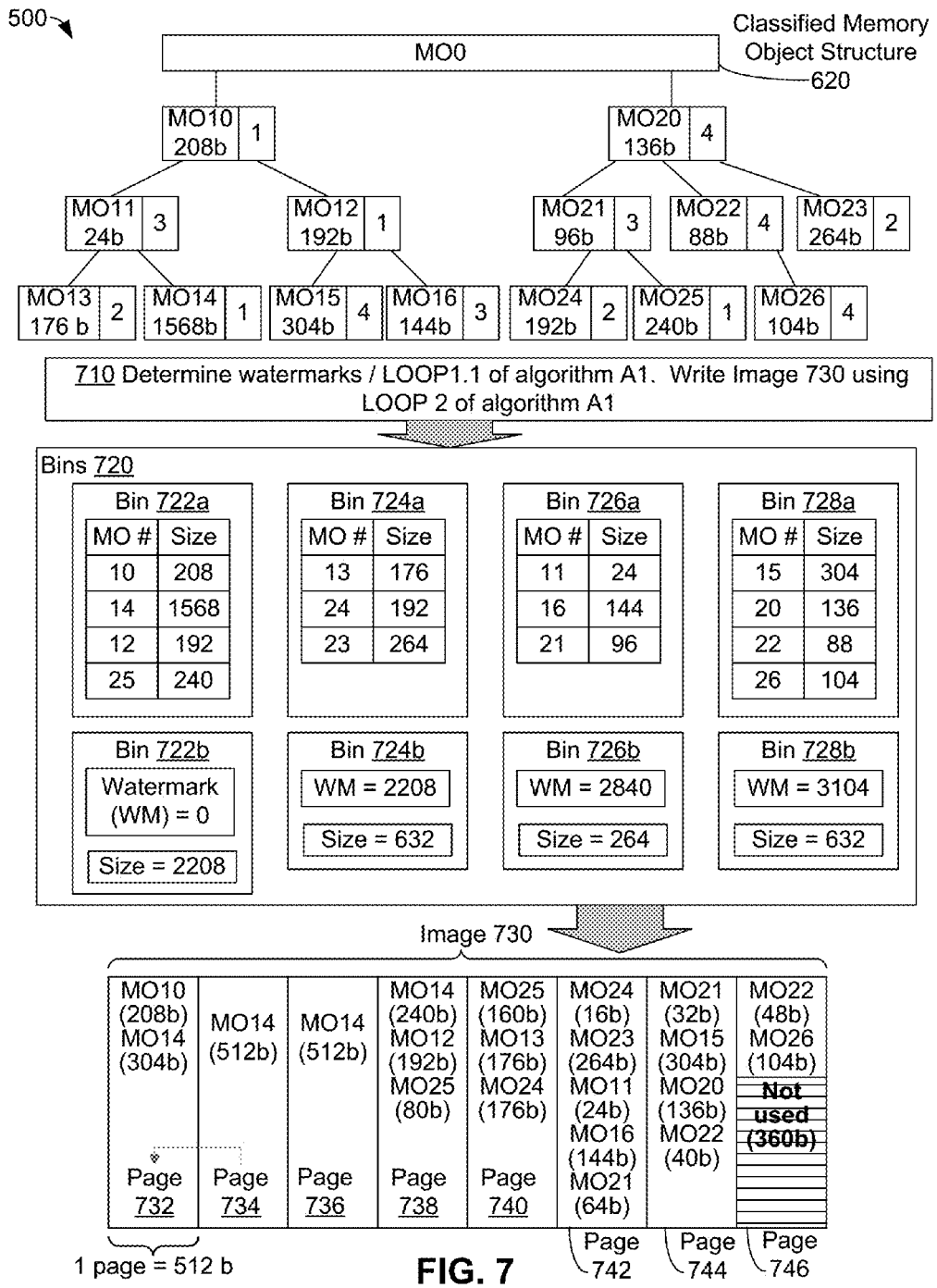
FIG. 7 shows the classified memory object structure of FIG. 6, corresponding bins storing part of the classified memory object structure, and a related memory image, in accordance with an example embodiment.

FIG. 7 shows classified memory object structure 620, corresponding bins 720 storing part of the classified memory object structure 620, and related memory image 730, in accordance with an example embodiment. Executing LOOP1 of algorithm A1 also generates bins such as bins 720—for ease of illustration, bins 722*a*, 724*a*, 726*a*, and 728*a* are shown with memory objects stored in the bins and corresponding sizes of memory objects. However, as discussed above, algorithm A1 as described in Table 1 operates on bins having structures such as shown in bins 722*b*, 724*b*, 726*b*, and 728*b*, with each of bins 722*b*-728*b* having a size attribute and a watermark (WM) attribute. LOOP1 of algorithm 1 can calculate the size of each bin 722*b*, 724*b*, 726*b*, and 728*b* while classifying memory objects MO10-MO16 and MO20-MO26.

As shown by classified memory structure 620 and bin 722*a* of FIG. 7, four memory objects—MO10, MO12, MO14, and MO25 are classified with classification/bin number 1. As indicated by either classified memory structure 620 or bin 722*a* of FIG. 7, memory objects MO10, MO12, MO14, and MO25 have a combined size of 208+1568+192+240=2208 bytes, which is the value of the size attribute of bin 722*b* (after execution of LOOP1), which corresponds to bin 722*a*, as both bins 722*a* and 722*b* are associated with classification/bin number 1.

As indicated by either classified memory structure 620 or bin 724*a* of FIG. 7, memory objects MO13, MO24, and MO23 are all classified with classification/bin number 2 and have a combined size of 176+192+264=632 bytes, which is the value of the size attribute of bin 724*b* (after execution of LOOP1), which corresponds to bin 724*a*, as both bins 724*a* and 724*b* are associated with classification/bin number 2. As further indicated by either classified memory structure 620 or bin 726*a* of FIG. 7, memory objects MO11, MO16, and MO21 are all classified with classification/bin number 3 and have a combined size of 24+144+96=264 bytes, which is the value of the size attribute of bin 726*b* (after execution of LOOP1), which corresponds to bin 726*a*, as both bins 726*a* and 726*b* are associated with classification/bin number 2. As additionally indicated by either classified memory structure 620 or bin 728*a* of FIG. 7, memory objects MO15, MO20, MO22, and MO26 are all classified with classification/bin number 4 and have a combined size of 304+136+88+104=632 bytes, which is the value of the size attribute of bin 728*b* (after execution of LOOP1), which corresponds to bin 728*a*, as both bins 728*a* and 728*b* are associated with classification/bin number 4.

Then, as indicated by block 710 of FIG. 7, LOOP1.1 and: LOOP2 of algorithm A1 are executed. LOOP1.1 of algorithm A1 calculates watermark attribute values shown in bins 722*b*, 724*b*, 726*b*, and 728*b* of FIG. 7. Note that the size and watermark values shown in FIG. 7 for bins 722*b*, 724*b*, 726*b*, and 728*b* are the values after execution of LOOP1.1, not after execution of LOOP2.

As bin 722*b* is the first bin of bins 722*b*-728*b*, its watermark value remains at 0 after execution of LOOP1.1, as shown in FIG. 7. Then, the watermark of the next bin, bin 724*b*, would be set equal to the sum of the watermark and size attributes of the preceding bin (bin 722*b*); that is, the watermark attribute of bin 724*b* is set to 2208 (bin 722*b*'s size)+0 (bin 722*b*'s watermark)=2208, which is the value of the watermark attribute of bin 724*b* as shown in FIG. 7.

Subsequently, the watermark of bin 726*b* can be set equal to the sum of the watermark and size attributes of the preceding bin (bin 724*b*); that is, the watermark attribute of bin 726*b* is set to 632 (bin 722*b*'s size)+2208 (bin 722*b*'s watermark)=2840. FIG. 7 confirms that 2840 is the value of the watermark attribute of bin 726*b*. LOOP1.1 can then set the watermark of bin 728*b* equal to the sum of the watermark and size attributes of the preceding bin (bin 726*b*); that is, set the watermark of bin 728*b* equal to 2840 (bin 726*b*'s watermark)+264 (bin 726*b*'s size)=3104, which is the value of the watermark attribute of bin 728*b* shown in FIG. 7.

Scenario 500 continues with LOOP2 of algorithm A1 being executed to generate image 730. As discussed above in the context of Table 1, LOOP2 of algorithm A1 visits memory objects of classified memory object structure 620 using depth-first traversal, writes the objects to image 730 from classified memory object structure 620, and updates bin attributes to account for the written image. As the watermark values shown for bins 722*b*, 724*b*, 726*b*, and 728*b* increase as bin numbers (and therefore, associated classifications) increase, image 730 is written with the context of bin 722*a* first, followed by the contents of bins 724*b* and 726*b*, and terminated with the contents of bin 728*b*; i.e., the objects of image 730 are written by LOOP2 using the order of object classifications.

FIG. 7 shows that image 730 generated by LOOP2 occupies portions of eight pages, with page 732 storing memory object MO10 and part of MO14, page 734 storing a portion of memory object MO14, page 736 storing a portion of memory object MO14, page 738 storing portions of memory objects MO14 and MO25 as well as memory object MO12, page 740 storing portions of memory objects MO24 and MO25 as well as all of memory object MO13, page 742 storing portions of memory objects MO21 and MO24, as well as all of memory objects MO11, MO16, and MO23, page 744 storing portions of memory objects MO21 and MO22 and all of memory objects MO15 and MO20, and page 546 storing a portion of memory object MO22 and all of memory object MO26.

FIG. 8 shows both memory image 530 and memory image 730 after being loaded into memory as respective loaded images 850 and 870 and after several memory writes have occurred, in accordance with an example embodiment. As discussed above, scenario 500 includes generation of image 530 by algorithm A2 and generation of image 730 by algorithm A2

Scenario 500 continues with example writes to seven memory objects in each of loaded images 850 and 870 being performed as shown in written MO list 810; e.g., the writes to the seven memory objects are performed during one or more executions of software that utilizes memory objects MO10-MO16 and MO20-MO26. Each page of loaded images 850 and 870 that stores a memory object shown in written MO list 810 is shown in FIG. 8 with a grey background to represent a dirty/written-to memory page. In scenario 500, the example writes in written MO are based on the estimated write probabilities shown in Table 4.above and bin classifications 610 of FIG. 6.

As can be seen in FIG. 8, loaded image 870, which is generated using algorithm A1 and so has memory objects arranged within the image based on the Table 4 above and bin classifications 610 has: (a) five leftmost clean pages each with a dirty percentage of 0% and (c) three rightmost dirty pages having dirty percentages ranging from 30-97%, indicating that dirty objects occupy between 152 bytes and 496 bytes of the three dirty pages. The overall dirty percentage for an image I in scenario 500 (e.g., I is one of loaded images 850 and 870) can be determined by taking a ratio of the total size of dirty objects in image I to the total size of all dirty pages for image I and multiplying that ratio by 100%. In scenario 500, the sizes of memory objects in written MO list 800 are: 24 bytes for memory object MO11, 304 bytes for memory object MO15, 144 bytes for memory object MO16, 96 bytes for memory object MO21, 88 bytes for memory object MO22, 264 bytes for memory object MO23, and 104 bytes for memory object MO26. The total size of the memory objects of written MO list 810 is: 24+304+144+96+88+264+104=1024 bytes. And, the total size of the dirty pages in loaded image 870=512*3=1568. Then, the overall dirty percentage for loaded image 870 is: 1024/1568*100%=66.67%.

In contrast, loaded image 850, which is generated using algorithm A2 and so has memory objects arranged within the image based on the order memory objects are initially visited, has: (a) three clean pages with a dirty percentage of 0% and (c) five dirty pages with a dirty percentage ranging from 5-77%, indicating that dirty objects occupy between 152 bytes and 496 bytes of the three dirty pages. The overall dirty percentage for loaded image 850 can be determined by taking the ratio of the total size of 1024 bytes occupied by the dirty objects in loaded image 850 to the total size of 512*5=2560 bytes of the dirty pages in loaded image 850. Then, the overall dirty percentage for loaded image 870 is: 1024/2560*100%=40%.

In summary, for the example writes shown in written MO list 810, loaded image 850 generated using algorithm A2 has two more dirty pages than loaded image 870 generated using algorithm A1. Further, the overall dirty percentage of 66.67% for loaded image 870 is significantly higher than the 40% overall dirty percentage for loaded image 870. These dirty page count and overall dirty percentage values indicate that algorithm A1 can generate images that have fewer dirty pages and whose dirty pages have higher overall dirty percentages than algorithm A2.

Example Data Network

Figure 9:
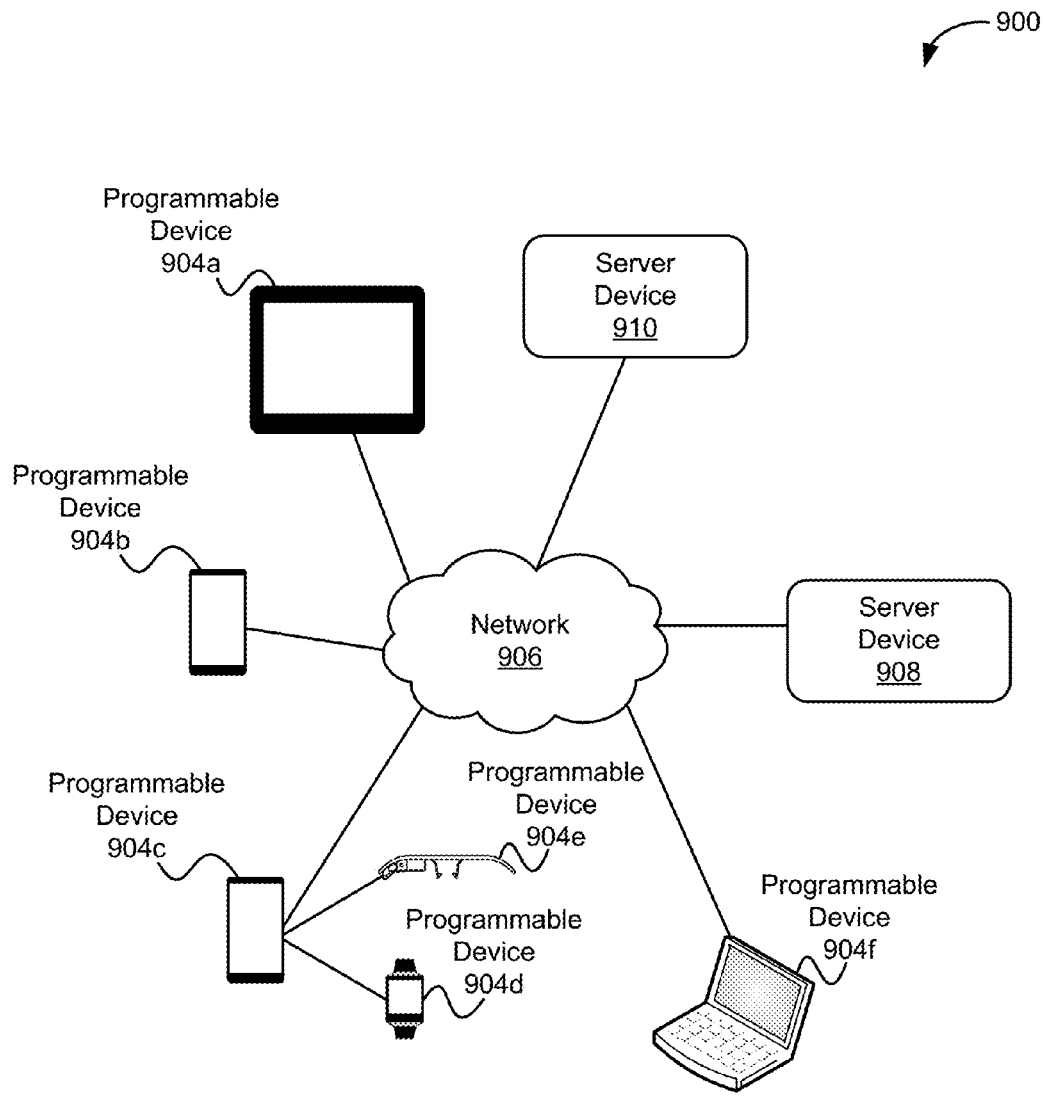
FIG. 9 depicts a distributed computing architecture, in accordance with an example embodiment.

FIG. 9 depicts a distributed computing architecture 900 with server devices 908, 910 configured to communicate, via network 906, with programmable devices 904a, 904b, 904c, 904d, 904e, and 904f, in accordance with an example embodiment. Computing architecture 900 can represent one or more computing devices that can generate and/or utilize one or more memory, boot, and/or other images written using the herein-described techniques related to image generation; e.g., algorithm A1. Network 906 may correspond to a LAN, a wide area network (WAN), a corporate intranet, the public Internet, or any other type of network configured to provide a communications path between networked computing devices. The network 906 may also correspond to a combination of one or more LANs, WANs, corporate intranets, and/or the public Internet.

Although FIG. 9 only shows five programmable devices, distributed application architectures may serve tens, hundreds, or thousands of programmable devices. Moreover, programmable devices 904a, 904b, 904c, 904d, 904e, and 904f (or any additional programmable devices) may be any sort of computing device, such as an ordinary laptop computer, desktop computer, wearable computing device, mobile computing device, head-mountable device, network terminal, wireless communication device (e.g., a smart phone or cell phone), and so on. In some embodiments, such as indicated with programmable devices 904a, 904b, 904c, and 904f, programmable devices can be directly connected to network 906. In other embodiments, such as indicated with programmable devices 904d and 904e, programmable devices can be indirectly connected to network 906 via an associated computing device, such as programmable device 904c. In this example, programmable device 904c can act as an associated computing device to pass electronic communications between programmable devices 904d and 904e and network 906. In still other embodiments not shown in FIG. 9, a programmable device can be both directly and indirectly connected to network 906.

Server devices 908, 910 can be configured to perform one or more services, as requested by programmable devices 904a-904f. For example, server device 908 and/or 910 can provide content to programmable devices 904a-904f. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 908 and/or 910 can provide programmable devices 904a-904f with access to software for database, search, computation, graphical, audio, video, World Wide Web/Internet utilization, and/or other functions. Many other examples of server devices are possible as well.

Computing Device Architecture

Figure 10A:
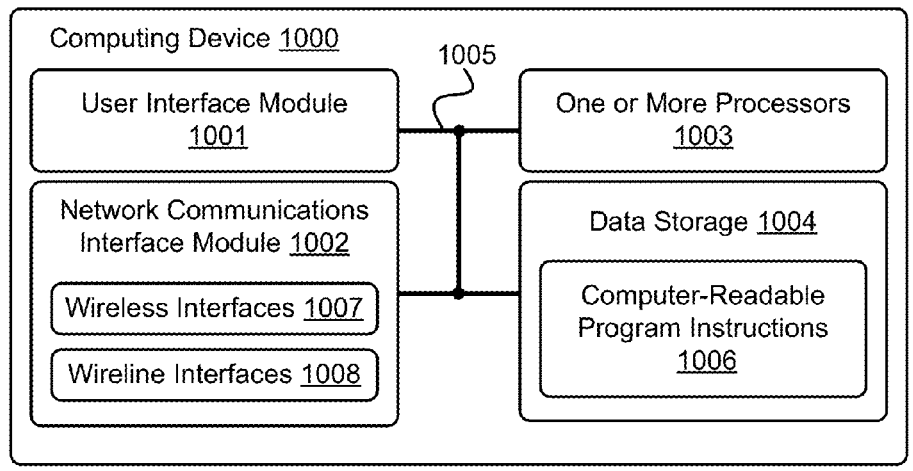
FIG. 10A is a block diagram of a computing device, in accordance with an example embodiment.

FIG. 10A is a block diagram of a computing device 1000 (e.g., system) in accordance with an example embodiment. Computing device 1000 can represent a computing device that can generate and/or utilize one or more memory, boot, and/or other images written using the herein-described techniques related to image generation; e.g., algorithm A1. In particular, computing device 1000 shown in FIG. 10A can be configured to perform one or more functions related to at least algorithms A1 and A2, mobile device 102, memory 110, scenarios 100, 200, and 500, network 906, server devices 908, 910, programmable devices 904a, 904b, 904c, 904d, 904e, and 904f, and method 1100. Computing device 1000 may include a user interface module 1001, a network-communication interface module 1002, one or more processors 1003, and data storage 1004, all of which may be linked together via a system bus, network, or other connection mechanism 1005.

User interface module 1001 can be operable to send data to and/or receive data from exterior user input/output devices. For example, user interface module 1001 can be configured to send and/or receive data to and/or from user input devices such as a keyboard, a keypad, a touch screen, a computer mouse, a trackball, a joystick, a camera, a voice recognition module, and/or other similar devices. User interface module 1001 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 1001 can also be configured to generate audible output(s), such as a speaker, speaker jack, audio output port, audio output device, earphones, and/or other similar devices.

Network-communications interface module 1002 can include one or more wireless interfaces 1007 and/or one or more wireline interfaces 1008 that are configurable to communicate via a network, such as network 906 shown in FIG. 9. Wireless interfaces 1007 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 1008 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 1002 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 1003 can include one or more general purpose processors (e.g., central processing units) and/or one or more special purpose processors (e.g., digital signal processors, graphics processing units, application specific integrated circuits, etc.). Processors 1003 can be configured to execute computer-readable program instructions 1006 that are contained in the data storage 1004 and/or other instructions as described herein.

Data storage 1004 can include one or more computer-readable storage media that can be read and/or accessed by at least one of processors 1003. The one or more computer-readable storage media can include volatile and/or non-volatile storage components, such as optical, magnetic, organic or other memory or disc storage, which can be integrated in whole or in part with at least one of processors 1003. In some embodiments, data storage 1004 can be implemented using a single physical device (e.g., one optical, magnetic, organic or other memory or disc storage unit), while in other embodiments, data storage 1004 can be implemented using two or more physical devices.

Data storage 1004 can include computer-readable program instructions 1006 and perhaps additional data. In some embodiments, data storage 1004 can additionally include storage required to perform at least part of the herein-described scenarios, methods, and techniques and/or at least part of the functionality of the herein-described devices and networks.

In some embodiments, computing device 1000 can include one or more sensors. The sensor(s) can be configured to measure conditions in an environment for computing device 1000 and provide data about that environment. The data can include, but is not limited to, location data about computing device 1000, velocity (speed, direction) data about computing device 1000, acceleration data about computing device, and other data about the environment for computing device 1000. The sensor(s) can include, but are not limited to, Global Positioning System (GPS) sensor(s), location sensors(s), gyroscope(s), accelerometer(s), magnetometer(s), camera(s), light sensor(s), infrared sensor(s), and microphone(s). Other examples of sensors are possible as well.

Cloud-Based Servers

Figure 10B:
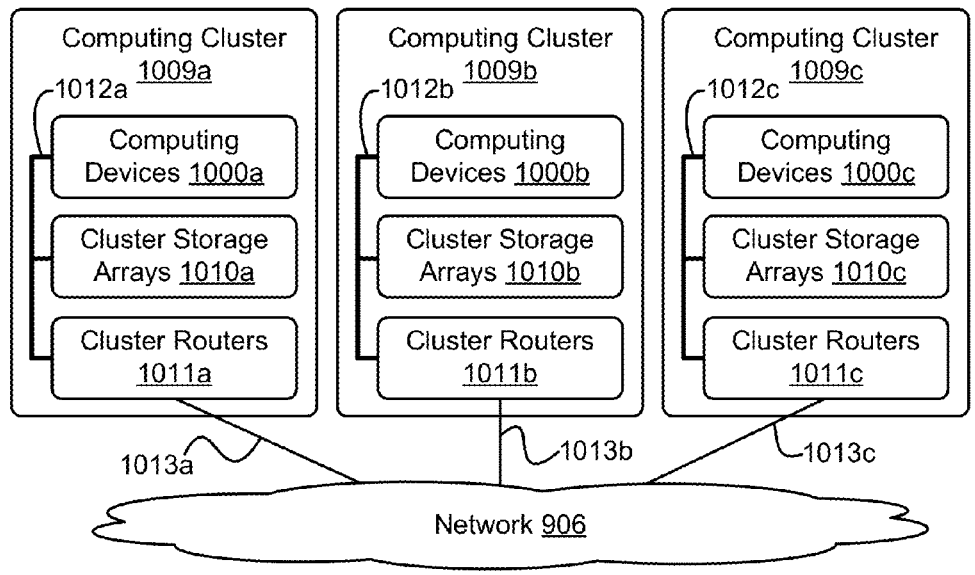
FIG. 10B depicts a cloud-based server system, in accordance with an example embodiment.

FIG. 10B depicts network 906 of computing clusters 1009a, 1009b, 1009c arranged as a cloud-based server system in accordance with an example embodiment. Server devices 908 and/or 910 and/or computing clusters 1009a, 1009b, and/or 1009c can represent one or more computing devices that can generate and/or utilize one or more memory, boot, and/or other images written using the herein-described techniques related to image generation; e.g., algorithm A1. In particular, server devices 908 and/or 910 and/or computing clusters 1009a, 1009b, and/or 1009c can be configured to perform some or all of the herein-described functions related to at least algorithms A1 and A2, mobile device 102, memory 110, scenarios 100, 200, and 500, and method 1100.

Some or all of the modules/components of server devices 908 and/or 910 can be cloud-based devices that store program logic and/or data of cloud-based applications and/or services. In some embodiments, server devices 908 and/or 910 can be on a single computing device residing in a single computing center. In other embodiments, server devices 908 and/or 910 can include multiple computing devices in a single computing center, or even multiple computing devices located in multiple computing centers located in diverse geographic locations. For example, FIG. 10 depicts each of server devices 908 and 910 residing in different physical locations.

In some embodiments, software and data associated with server devices 908 and/or 910 can be encoded as computer readable information stored in non-transitory, tangible computer readable media (or computer readable storage media) and accessible by one or more of programmable devices 1004a-1004e and/or other computing devices. In some embodiments, data associated with server devices 908 and/or 910 can be stored on a single disk drive, flash drive, or other tangible storage media, or can be implemented on multiple disk drives, flash drives, or other tangible storage media located at one or more diverse geographic locations.

FIG. 10B depicts a cloud-based server system in accordance with an example embodiment. In FIG. 10B, the functions of server devices 908 and/or 910 can be distributed among three computing clusters 1009a, 1009b, and 1009c. Computing cluster 1009a can include one or more computing devices 1000a, cluster storage arrays 1010a, and cluster routers 1011a connected by a local cluster network 1012a. Similarly, computing cluster 1009b can include one or more computing devices 1000b, cluster storage arrays 1010b, and cluster routers 1011b connected by a local cluster network 1012b. Likewise, computing cluster 1009c can include one or more computing devices 1000c, cluster storage arrays 1010c, and cluster routers 1011c connected by a local cluster network 1012c.

In some embodiments, each of the computing clusters 1009a, 1009b, and 1009c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 1009a, for example, computing devices 1000a can be configured to perform various computing tasks of server devices 908 and/or 910. In one embodiment, the various functionalities of server devices 908 and/or 910 can be distributed among one or more of computing devices 1000a, 1000b, and 1000c. Computing devices 1000b and 1000c in computing clusters 1009b and 1009c can be configured similarly to computing devices 1000a in computing cluster 1009a. On the other hand, in some embodiments, computing devices 1000a, 1000b, and 1000c can be configured to perform different functions.

In some embodiments, computing tasks and stored data associated with server devices 908 and/or 910 be distributed across computing devices 1000a, 1000b, and 1000c based at least in part on the storage and/or processing requirements of some or all components/modules of server devices 908 and/or 910, the storage and/or processing capabilities of computing devices 1000a, 1000b, and 1000c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 1010a, 1010b, and 1010c of the computing clusters 1009a, 1009b, and 1009c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 908 and/or 910 can be distributed across computing devices 1000a, 1000b, and 1000c of computing clusters 1009a, 1009b, and 1009c, various active portions and/or backup portions of data for these components can be distributed across cluster storage arrays 1010a, 1010b, and 1010c. For example, some cluster storage arrays can be configured to store the data of one or more modules/components of server devices 908 and/or 910, while other cluster storage arrays can store data of other modules/components of server devices 908 and/or 910. Additionally, some cluster storage arrays can be configured to store backup versions of data stored in other cluster storage arrays.

The cluster routers 1011a, 1011b, and 1011c in computing clusters 1009a, 1009b, and 1009c can include networking equipment configured to provide internal and external communications for the computing clusters. For example, the cluster routers 1011a in computing cluster 1009a can include one or more internet switching and routing devices configured to provide (i) local area network communications between the computing devices 1000a and the cluster storage arrays 1001a via the local cluster network 1012a, and (ii) wide area network communications between the computing cluster 1009a and the computing clusters 1009b and 1009c via the wide area network connection 1013a to network 906. Cluster routers 1011b and 1011 c can include network equipment similar to the cluster routers 1011a, and cluster routers 1011b and 1011c can perform similar networking functions for computing clusters 1009b and 1009b that cluster routers 1011a perform for computing cluster 1009a.

In some embodiments, the configuration of the cluster routers 1011a, 1011b, and 1011c can be based at least in part on the data communication requirements of the computing devices and cluster storage arrays, the data communications capabilities of the network equipment in the cluster routers 1011a, 1011b, and 1011c, the latency and throughput of local networks 1012a, 1012b, 1012c, the latency, throughput, and cost of wide area network links 1013a, 1013b, and 1013c, and/or other factors that can contribute to the cost, speed, fault-tolerance, resiliency, efficiency and/or other design goals of the moderation system architecture.

Example Methods of Operation

Figure 11:
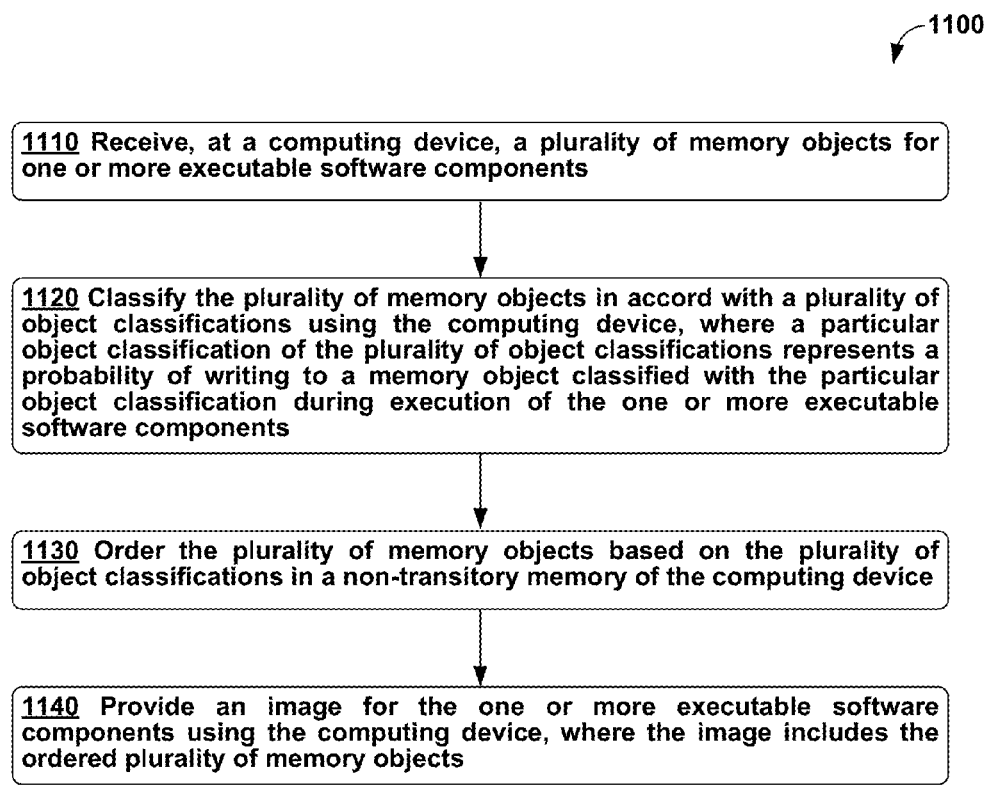
FIG. 11 is a flowchart illustrating a method, in accordance with an example embodiment.

FIG. 11 is a flowchart illustrating method 1100, in accordance with an embodiment. Method 1100 can be carried out by a computing device, such as, but not limited to, one or more computing devices 1000.

Method 1100 can begin at block 1110. At block 1110, the computing device can receive plurality of memory objects for one or more executable software components, such as discussed above in the context of at least scenario 100 discussed in the context of at least FIG. 1, memory objects MO201-MO280 of scenario 200 discussed in the context of at least FIGS. 2-4, and memory objects MO10-MO16 and MO20-MO26 of scenario 500 discussed in the context of at least FIGS. 5-8. In some embodiments, the one or more executable software components can be configured to run upon initialization of a particular computing device; i.e., can become part of a boot image. In other embodiments, the one or more executable software components can relate to a software application.

At block 1120, the computing device can classify the plurality of memory objects in accord with a plurality of object classifications. A particular object classification of the plurality of object classifications can represent a probability of writing to a memory object classified with the particular object classification during execution of the one or more executable software components, such as classifications used in scenario 200 discussed in the context of at least FIGS. 2-4 and scenario 500 discussed in the context of at least FIGS. 5-8.

In some embodiments, the one or more memory objects of the plurality of memory objects can be associated with one or more object types, and the plurality of object classifications can be based upon the one or more object types, such as classifications used in scenario 500 discussed in the context of at least FIGS. 5-8.

In other embodiments, classifying the plurality of memory objects in accord with the plurality of object classifications can include: determining a plurality of bins associated with the plurality of object classifications, where a particular bin of the plurality of bins is associated with a particular object classification of the plurality of object classifications, and where the particular bin includes a watermark value and a size value; and assigning at least a particular memory object to the particular bin, such as discussed above at least in the context of the bins used by algorithm A1 in at least scenarios 200 and 500 and associated with at least FIGS. 2-8.

In particular of the other embodiments, assigning at least the particular memory object to the particular bin can include: determining a size of the particular memory object; updating the size value of the particular bin based on the size of the particular memory object; and updating the particular memory object to indicate the particular object classification associated with the particular bin, such as discussed above at least in the context of LOOP1 of algorithm A1 in at least scenarios 200 and 500 and associated with at least FIGS. 2-8.

In other particular of the other embodiments, the plurality of bins can be ordered by a bin ordering that corresponds to the plurality of object classifications. Then, method 1100 can additionally include: determining the watermark value of the particular bin based on a watermark value of a previous bin in the bin ordering, such as discussed above at least in the context of LOOP1.1 of algorithm A1 in at least scenarios 200 and 500 and associated with at least FIGS. 2-8.

At block 1130, the computing device can order the plurality of memory objects based on the plurality of object classifications in a non-transitory memory of the computing device, such as discussed above in the context of at least LOOP1 and LOOP2.1 of algorithm A1 and discussed as part of in scenario 200 discussed in the context of at least FIGS. 2-4 and scenario 500 discussed in the context of at least FIGS. 5-8.

At block 1140, the computing device can provide an image for the one or more executable software components, where the image can include the ordered plurality of memory objects, such as discussed above in the context of at least LOOP2 of algorithm A1 and discussed as part of scenario 200 in the context of at least FIGS. 2-4 and as part of scenario 500 in the context of at least FIGS. 5-8.

In some embodiments, classifying the memory objects using the plurality of object classifications can include placing a memory object of the plurality of memory objects into a priority queue associated with a plurality of priorities, where the plurality of priorities are related to the plurality of object classifications, such as discussed above in the context at least LOOP2.1 of algorithm A1. In particular embodiments, where providing an image includes: removing a memory object from the priority queue in accord with the plurality of priorities, such as discussed above in the context at least LOOP2.1 of algorithm A1.

In other embodiments, the image includes a plurality of pages. In these embodiments, providing the image for the one or more executable software components includes: determining a page ordering of the plurality of pages; and writing the ordered plurality of memory objects to the plurality of pages in accord with the page ordering, such as discussed above in the context of at least images 300 and 730, and loaded image 870 of scenarios 200 and 500.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flowcharts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flowcharts discussed herein, and these ladder diagrams, scenarios, and flowcharts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or nonvolatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
   receiving, at a computing device, a plurality of memory objects for one or more executable software components;
   classifying the plurality of memory objects in accord with a plurality of object classifications using the computing device, wherein a particular object classification of the plurality of object classifications represents a write probability of writing to a memory object classified with the particular object classification during execution of the one or more executable software components;
   ordering the plurality of memory objects in increasing order of write probabilities for the plurality of memory objects based on the plurality of object classifications in a non-transitory memory of the computing device;
   providing an image for the one or more executable software components to one or more computing devices using the computing device, wherein the image comprises the ordered plurality of memory objects; and
   initializing at least one computing device of the one or more computing devices by:
      loading the one or more executable software components into the at least one computing device from the provided image; and
      executing the one or more software executable components on the at least one computing device.

2. The method of claim 1, wherein one or more memory objects of the plurality of memory objects are associated with one or more object types, and wherein the plurality of object classifications are based upon the one or more object types.

3. The method of claim 1, wherein the one or more executable software components are configured to run upon initialization of a particular computing device.

4. The method of claim 1, wherein the image comprises a plurality of pages, and wherein providing the image for the one or more executable software components comprises:
   determining a page ordering of the plurality of pages; and
   writing the ordered plurality of memory objects to the plurality of pages in accord with the page ordering.

5. The method of claim 1, wherein classifying the plurality of memory objects in accord with the plurality of object classifications comprises:
   determining a plurality of bins associated with the plurality of object classifications, wherein a particular bin of the plurality of bins is associated with a particular object classification of the plurality of object classifications, and wherein the particular bin comprises a watermark value and a size value; and
   assigning at least a particular memory object to the particular bin.

6. The method of claim 5, wherein assigning at least the particular memory object to the particular bin comprises:
   determining a size of the particular memory object;
   updating the size value of the particular bin based on the size of the particular memory object; and
   updating the particular memory object to indicate the particular object classification associated with the particular bin.

7. The method of claim 5, wherein the plurality of bins are ordered by a bin ordering that corresponds to the plurality of object classifications, and wherein the method further comprises:
   determining the watermark value of the particular bin based on a watermark value of a previous bin in the bin ordering.

8. The method of claim 1, wherein classifying the memory objects using the plurality of object classifications comprises placing a memory object of the plurality of memory objects into a priority queue associated with a plurality of priorities, and wherein the plurality of priorities are related to the plurality of object classifications.

9. The method of claim 8, wherein providing an image comprises: removing a memory object from the priority queue in accord with the plurality of priorities.

10. A computing device, comprising:
    one or more processors; and
    data storage having instructions stored thereon that, upon execution of the instructions by the one or more processors, cause the one or more processors to perform functions comprising:
       receiving a plurality of memory objects for one or more executable software components;
       classifying the plurality of memory objects in accord with a plurality of object classifications, wherein a particular object classification of the plurality of object classifications represents a write probability of writing to a memory object classified with the particular object classification during execution of the one or more executable software components;
       ordering the plurality of memory objects in increasing order of write probabilities for the plurality of memory objects based on the plurality of object classifications in the data storage;
       providing an image for the one or more executable software components to one or more computing devices, wherein the image comprises the ordered plurality of memory objects; and
       initializing at least one computing device of the one or more computing devices by:
          loading the one or more executable software components into the at least one computing device from the provided image; and
          executing the one or more software executable components on the at least one computing device.

11. The computing device of claim 10, wherein one or more memory objects of the plurality of memory objects are associated with one or more object types, and wherein the plurality of object classifications are based upon the one or more object types.

12. The computing device of claim 10, wherein the one or more executable software components are configured to run upon initialization of a particular computing device.

13. The computing device of claim 10, wherein the image comprises a plurality of pages, and wherein providing the image for the one or more executable software components comprises:
    determining a page ordering of the plurality of pages; and
    writing the ordered plurality of memory objects to the plurality of pages in accord with the page ordering.

14. The computing device of claim 10, wherein classifying the plurality of memory objects in accord with the plurality of object classifications comprises:
- determining a plurality of bins associated with the plurality of object classifications, wherein a particular bin of the plurality of bins is associated with a particular object classification of the plurality of object classifications, and wherein the particular bin comprises a watermark value and a size value; and
- assigning at least a particular memory object to the particular bin.

15. The computing device of claim 14, wherein assigning at least the particular memory object to the particular bin comprises:
- determining a size of the particular memory object;
- updating the size value of the particular bin based on the size of the particular memory object; and
- updating the particular memory object to indicate the particular object classification associated with the particular bin.

16. The computing device of claim 14, wherein the plurality of bins are ordered by a bin ordering that corresponds to the plurality of object classifications, and wherein the functions further comprise:
- determining the watermark value of the particular bin based on a watermark value of a previous bin in the bin ordering.

17. The computing device of claim 9, wherein classifying the memory objects using the plurality of object classifications comprises placing a memory object of the plurality of memory objects into a priority queue associated with a plurality of priorities, wherein the plurality of priorities are related to the plurality of object classification, and wherein providing an image comprises: removing a memory object from the priority queue in accord with the plurality of priorities.

18. An article of manufacture including non-transitory data storage having instructions stored thereon that, when executed by one or more processors, cause the one or more processors to perform functions comprising:
- receiving a plurality of memory objects for one or more executable software components;
- classifying the plurality of memory objects in accord with a plurality of object classifications, wherein a particular object classification of the plurality of object classifications represents a write probability of writing to a memory object classified with the particular object classification during execution of the one or more executable software components;
- ordering the plurality of memory objects in increasing order of write probabilities for the plurality of memory objects based on the plurality of object classifications;
- providing an image for the one or more executable software components to one or more computing devices, wherein the image comprises the ordered plurality of memory objects; and
- initializing at least one computing device of the one or more computing devices by:
  - loading the one or more executable software components into the at least one computing device from the provided image; and
  - executing the one or more software executable components on the at least one computing device.

19. The article of manufacture of claim 18, wherein one or more memory objects of the plurality of memory objects are associated with one or more object types, and wherein the plurality of object classifications are based upon the one or more object types.

20. The article of manufacture of claim 18, wherein classifying the plurality of memory objects in accord with the plurality of object classifications comprises:
- determining a plurality of bins associated with the plurality of object classifications, wherein a particular bin of the plurality of bins is associated with a particular object classification of the plurality of object classifications, and wherein the particular bin comprises a watermark value and a size value; and
- assigning at least a particular memory object to the particular bin.

* * * * *